United States Patent
Kawaguchi et al.

(10) Patent No.: US 6,319,706 B1
(45) Date of Patent: Nov. 20, 2001

(54) PROCESS AND APPARATUS FOR REMEDYING POLLUTED MEDIA

(75) Inventors: Masahiro Kawaguchi; Etsuko Sugawa, both of Atsugi; Yoshiyuki Toge, Sagamihara; Akira Kuriyama, Atsugi; Takeshi Imamura, Chigasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/079,166

(22) Filed: May 15, 1998

(30) Foreign Application Priority Data

| May 15, 1997 | (JP) | 9-125541 |
| Feb. 9, 1998 | (JP) | 10-027110 |
| Mar. 31, 1998 | (JP) | 10-086704 |

(51) Int. Cl.$^7$ .................................................... C12M 1/00
(52) U.S. Cl. ........................ 435/293.1; 435/293.2; 435/297.4
(58) Field of Search ............................ 435/289.1, 293.1, 435/293.2, 297.1, 297.2, 297.4, 297.3; 210/601, 610; 405/128, 129

(56) References Cited

U.S. PATENT DOCUMENTS

| 4,391,912 | * | 7/1983 | Yoshida et al. | 435/241 |
| 4,925,802 | | 5/1990 | Nelson et al. | 435/262 |
| 4,988,443 | | 1/1991 | Michaels et al. | 210/611 |
| 5,577,558 | | 11/1996 | Abdul et al. | 166/246 |
| 5,626,437 | | 5/1997 | Hunt et al. | 405/128 |

FOREIGN PATENT DOCUMENTS

| 3542599 | | 6/1987 | (DE). |
| 0 470 377 A | * | 2/1992 | (EP). |
| 02-092274 | | 4/1990 | (JP). |
| 03-292970 | | 12/1991 | (JP). |
| 6-22769 | | 2/1994 | (JP). |
| 06-070753 | | 3/1994 | (JP). |
| 93/06045 | | 4/1993 | (WO). |
| 95/26806 | | 10/1995 | (WO). |

OTHER PUBLICATIONS

Wackett, et al; "Survey of . . . Bacteria", Appl. & & Environ. Microb., vol. 55, No. 11, pp. 2960–2963 (1989).
Embley, et al; "Lactobacillus . . . Human Vagina", Int. J. Systm. Bact., vol. 39, No. 3, pp. 368–369 (1989).
Beam, et al., "Microbial Degradation of Cycloparaffinic Hydrocarbons via Co–metabolism and Commensalism", J. Gen. Microbiol., vol. 82, (1974), pp. 163–169.
Nelson, et al., "Aerobic Metabolism of Trichloroethylene by a Bacterial isolate", Appl. & Environ. Microb., vol. 52, No. 2 (1986), pp. 383–384.
Nelson, et al., "Biodegradation of Trichloroethylene and involvement of an Aromatic Biodegradative Pathway", Appl. & Environ. Microb., vol. 53, No. 5, (1987), pp. 949–954.
Journal of Japan Sewage Works Asso., vol. 24, No. 273, 1987/2, pp. 27–33.
Little, et al., "Trichloroethylene Biodegradation by a Methane–Oxidizing Bacterium", Appl. & Environ. Microb., vol. 54, No. 4, (1988), pp. 951–956.

(List continued on next page.)

Primary Examiner—David A. Redding
(74) Attorney, Agent, or Firm—Fitzpatrick, Cella, Harper & Scinto

(57) ABSTRACT

A process to remedy a polluted medium includes contacting a first medium containing a pollutant with a second medium containing a microorganism which is capable of decomposing the pollutant. A membrane permeable to the pollutant and impermeable to the microorganism is spaced between the first and second media. The first medium and the second medium may flow in opposite directions to each other.

8 Claims, 17 Drawing Sheets

OTHER PUBLICATIONS

Wackett, et al., "Degradation of Trichloroethylene by Toluene Dioxygenase in Whole–Cell Studies with *Pseudomonas putida* F1", Appl. & Environ. Microb., vol. 54, No. 7 (1988), pp. 1703–1708.

Vandenbergh, et al., "Metabolism of Volatile Chlorinated Aliphatic Hydrocarbons by *Pseudomonas fluorescens*", Appl. & Environ. Microb., vol. 54, No. 10, (1988), pp. 2578–2579.

Tsien, et al., "Biodegradation of Trichloroethylene by *Methylosinus trichosporium* OB3b", Appl. & Environ. Microb., vol. 55, No. 12, (1989), pp. 3155–3161.

Winter, et al., "Efficient Degradation of Trichloroethylene by a Recombinant *Escherichia Coli*", Bio/Techn., vol. 7, (1989), pp. 282–285.

Uchiyama, et al., "Aerobic Degradation of Trichloroethylene by a new Type II Methane–Utilizing Bacterium, Strain M", Agric. Biol. Chem., vol. 53, No. 11, (1989), pp. 2903–2907.

Hanson, et al., "Development of Methanotrophs for the Biodegradation of Trichloroethylene and Other Chlorinated Olefins", Preprint Extended Abstract before Am. Chem. Soc., Sep. 1989, pp. 365–367.

Vanelli, et al., "Degradation of halogenated Aliphatic Compounds by the Ammonia–Oxidizing Bacterium *Nitrosomonas europaea*", Appl. & Environ. Microb., vol. 56, No. 4, (1990), pp. 1169–1171.

Harker, et al., "Trichloroethylene Degradation by Two Independent Aromatic–Degrading Pathways in *Alcaligenes eutrophus* JMP134", Appl. & Environ. Microb., vol. 56, No. 4, (1990), pp. 1179–1181.

Folsom, et al., "Phenol and Trichloroethylene Degradation by *Pseudomonas cepacia* G4: Kinetics and Interactions between Substrates", Appl. & Environ. Microb., vol. 56, No. 5, (1990), pp. 1279–1285.

Ewers, et al., "Selection of trichloroethene (TCE) degrading bacteria that resist inactivation by TCE", Arch. Microbiol., vol. 154, (1990), pp. 410–413.

Henry, et al., "Influence of Endogenous and Exogenous Electron Donors and Trichloroethylene Oxidation Toxicity on Trichloroethylene Oxidation by Methanotrophic Cultures from a Groundwater Aquifer", Appl. & Environ. Microb., vol. 57, No. 1, (1991), pp. 236–244.

Shields, et al., "Mutants of *Pseudomonas cepacia* G4 Defective in Catabolism of Aromatic Compounds and Trichloroethylene", Appl. & environ. Microb., vol. 57, No. 7, (1991), pp. 1935–1941.

Eng, et al., "Methanol Suppression of Trichloroethylene Degradation by *Methylosinus trichosporium* (OB3b) and Methane–Oxidizing Mixed Cultures", Appl. Biochem & Biotech., vol. 28/29, (1991), pp. 887–899.

Nakajima, et al., "Novel Metabolite of Trichloroethylene in a Methanotrophic Bacterium, Methylocystis sp. M, and Hypothetical Degradation Pathway", Biosc. Biotech. Biochem., 56, 3, (1992), pp. 486–489.

Nakajima, et al., "Purification and properties of a Soluble Methane Monoxygenase from Methylocystis sp. M", Biosc., Biotech. Biochem, 56, 3 (1992), pp. 736–740.

* cited by examiner

PROCESS AND APPARATUS FOR REMEDYING POLLUTED MEDIA

BACKGROUND OF THE INVENTION

1. Field of the Invention

The present invention relates to a process for remedying medium polluted by a pollutant, and to an apparatus for the same.

2. Description of the Related Art

A large quantity of environmentally unsafe chemical substances have been produced as a result of recent advances in technology. Environmental pollution by chemical substances is a globally serious problem, since water and air can circulate throughout the world. As examples of well-known pollutants, there may be mentioned halogenated aliphatic hydrocarbons (e.g., dichloroethylene (DCE), trichloroethylene (TCE), tetrachloroethylene (PCE) and dioxin), aromatic compounds (e.g., toluene, xylene and benzene), crude petroleum, gasoline and the like. By way of illustration, dichloroethylene, trichloroethylene, tetrachloroethylene and other halogenated aliphatic hydrocarbons have been employed in large quantities as solvents for cleaning of precision parts or for dry cleaning. It has been established that these substances leak into soil and pollute the soil and underground water. Since these pollutants are highly volatile in general, they are also considered to cause air pollution. In addition, they may seriously affect the biotic kingdom, since it has been recently revealed that such pollutants are carcinogenic and teratogenic. Accordingly, there is a demand to develop, promptly, technologies for remedying polluted media such as soil, air and water.

As one possible solution for the aforementioned problems, the technique to decompose pollutants with the aid of microorganisms has been advanced. As microorganisms having decomposing activities for TCE, there have been reported, for example, the following microorganisms.

Welchia alkenophila sero 5 (ATCC 53570; U.S. Pat. No. 4,877,736),

Welchia alkenophila sero 33 (ATCC 53571; U.S. Pat. No. 4,877,736),

Methylocystis sp. strain M (Agric. Biol. Chem., 53,2903 (1989); Biosci. Biotech. Biochem., 56,486(1992); ibid. 56,736(1992)), Methylosinus trichosprium OB3b (Am. Chem. Soc. Natl. Meet. Dev. Environ. Microbiol., 29,365(1989); Appl. Environ. Microbiol., 55,3155(1989); Appl. Biochem. Biotechnol., 28,877(1991); Japanese Patent Laid-open No. 2-92274; Japanese Patent Laid-open No. 3-292970), Methylomonas sp. MM2 (Appl. Environ. Microbiol., 57,236(1991)), Alcaligenes denitrificans subsp. xylosoxidans JE75 (Arch. Microbiol., 154,410(1990)), Alcaligenes eutrophus JMP134 (Appl. Environ. Microbiol., 56,1179(1990)), Mycobacterium vaccae JOB5 (J. Gen. Microbiol., 82,163 (1974), Appl. Environ. Microbiol., 55,2960(1989) ATCC 29678), Pseudomonas putida BH (Journal of the Japan Sewage Works Association, 24,27(1987)), Pseudomonas sp. strain G4 (Appl. Environ. Microbiol., 52,383(1986); ibid. 53,949(1987); ibid. 54,951(1988), ibid. 56,1279(1990); ibid. 57,1935(1991); U.S. Pat. No. 4,925,802; ATCC 53617; this microorganism was first classified into Pseudomonas cepacia, but reclassified into Pseudomonas sp.), Pseudomonas mendocina KR-1 (Bio. Technol., 7,282 (1989)), Pseudomonas putida F1 (Appl. Environ. Microbiol., 54,1703(1988), ibid. 54,2578(1988)), Pseudomonas fluorescens PFL12 (Appl. Environ. Microbiol., 54,2578(1988)), Pseudomonas putida KWI-9 (Japanese Patent Laid-open No. 6-70753), Pseudomonas cepacia KK01 (Japanese Patent Laid-open No. 6-227769), Nitrosomonas europaea (Appl. Environ. Microbiol., 56,1169(1990)), and Lactobacillus vaginalis sp. nov. (Int. J. Syst. Bacteriol., 39,368(1989), ATCC 49540) and so on.

A practical example of a technique for decomposing pollutants and hence remedying media with the aid of such a microorganism includes the process of contacting the microorganism with a pollutant.

Decomposition of pollutants in media with the aid of microorganisms is not as yet a completely satisfactory technique. To be more specific, it is hard to decrease, for example, the trichloroethylene concentration in groundwater to below the environmental quality standard (0.03 $\mu$g/ml) in Japan in 1997, and even if possible, it takes a relatively long time for such reaction. To further enhance decomposition of a pollutant by a microorganism, techniques are required for improving decomposition efficiency on the pollutant or for shortening the required period of time for the microorganism to decompose the pollutant.

The present inventors have found that since a microorganism is damaged by an intermediate product or the like formed during decomposition of a pollutant, and its decomposition activity for a pollutant decreases with prolonged contacting time with the pollutant, such a microorganism requires a longer reaction time to decompose the pollutant lower to a given concentration. To further efficiently remedy a medium containing a pollutant in a concentration around the environmental quality standard, it is markedly helpful to contact a microorganism having a high decomposing activity for the pollutant.

SUMMARY OF THE INVENTION

The present invention has been completed based upon the above findings. It is, therefore, a principle object of the invention to provide a more efficient process of remedying a medium containing a pollutant and an apparatus used for the same.

It is another object of the present invention to provide a more efficient remedying process for a polluted soil.

To accomplish the above-mentioned objects, the present invention provides, in one embodiment, a process for remedying a polluted medium comprising the steps of:

(a) providing a membrane between a first medium containing a pollutant and a second medium containing a microorganism capable of decomposing the pollutant, the membrane permeable to the pollutant and impermeable to the microorganism; and (b) transporting the pollutant from the first medium to the second medium through the membrane to permit the microorganism to decompose the pollutant.

In a second embodiment, the invention includes a process for remedying soil polluted with a pollutant comprising the steps of:

(a) providing an apparatus comprising (i) a tubular case having openings at each end thereof for transporting a first medium containing the pollutant and (ii) a tubular member for transporting a second medium containing a microorganism capable of decomposing the pollutant, the tubular member having an outer wall composed of a membrane permeable to the pollutant and impermeable to the microorganism and being spaced in the tubular case to interpose the membrane between the first medium and the second medium;

(e) embedding the apparatus in the soil containing the pollutant;

(c) conducting the pollutant from the soil into the tubular case through one of the openings; and (d) introducing the second medium containing the microorganism into the tubular member, whereby the pollutant passes through the membrane to be decomposed by the microorganism.

In an additional embodiment the invention includes an apparatus for remedying a polluted medium comprising a housing having (a) a first passage for a first medium containing a pollutant; (b) a second passage for a second medium containing a microorganism for decomposing the pollutant, the second passage in fluid communication with the first passage; and (c) a membrane permeable to the pollutant and impermeable to the microorganism interposed between the first and second passages.

In yet another aspect the invention provides for a process for remedying a polluted medium comprising the steps of:

(a) providing a membrane between a first medium containing a pollutant and a second medium containing a microorganism capable of decomposing the pollutant, the membrane permeable to the pollutant and impermeable to the microorganism; and (b) transporting the pollutant from the first medium through the membrane to the second medium to permit the microorganism to decompose the pollutant, wherein the transporting step is conducted by providing a flow of the first medium in an opposite direction to a flow of the second medium.

Finally, in an additional embodiment the present invention is directed to an apparatus for remedying a polluted medium comprising a housing having (a) a first passage for a first medium containing a pollutant; (b) a second passage for a second medium containing a microorganism for decomposing the pollutant, the second passage in fluid communication with the first passage; (c) a membrane permeable to the pollutant and impermeable to the microorganism interposed between the first and second passages; and (d) means to cause the first medium and second medium to flow in opposite directions.

According to the embodiments, further improvement in remediation of the polluted medium can be accomplished and the time required for the remediation can also be shortened. It is not yet clear why the embodiment comprising making the first embodiment flow counter to the flow of the second medium provides additional advantages. Presumably, because the embodiment maintains contact between the pollutant and the microorganism at a certain level, enhanced results are obtained. That is, when the flow of the first and second media are in the same direction, then downstream of the flow, the concentration of the pollutant in the first medium is decreased. Also, since the decomposing activity of the microorganisms in the second medium may be weakened, the contact between the microorganism and pollutant may decrease and thus, it may take more time to accomplish further remediation.

DETAILED DESCRIPTION OF THE INVENTION

The present invention will be described below in detail with reference to several preferred embodiments of the invention.

First Embodiment

The present invention provides, in a first embodiment, a microorganism-flowing remediation process, which comprises forming, in an area in the presence of a pollutant (e.g., a soil, a ground water) a space surrounded by a diaphragm through which the pollutant can penetrate and a microorganism cannot penetrate. A fluid containing the pollutant permeates through the diaphragm into the fluid containing the microorganism. A schematic diagram of an apparatus for conducting the process is shown in FIG. 1.

Figure 1:
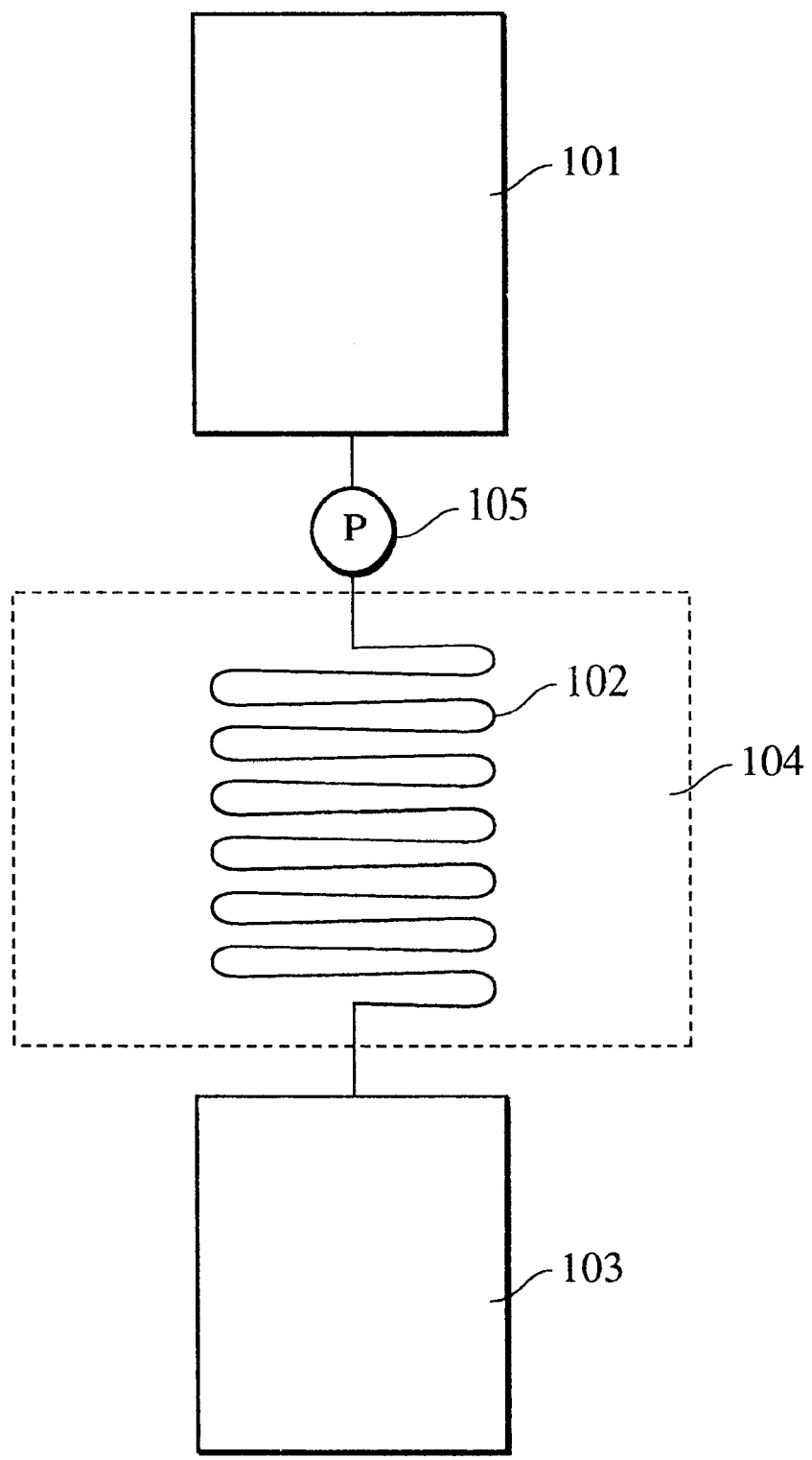
FIG. 1 is a schematic view illustrating a process for remedying a polluted medium and an apparatus used for the same according to a first embodiment of the present invention.

In FIG. 1, the reference numeral 101 is an incubator for the microorganism having decomposing activity for the pollutant; 102 is an area where a microorganism is flowing (microorganism-flowing-area) which comprises an outer wall composed of a membrane which does not allow the microorganism to penetrate, but does allow the pollutant to penetrate; 103 is a waste tank reserving a medium containing the microorganism which has been contacted with the pollutant in the microorganism-flowing area 102. Reference numeral 104 is an area containing the pollutant. Pump 105 transfers the medium containing the microorganism from the incubator 101 to the microorganism-flowing area 102.

As the pollutant penetrates through the membrane, it contacts the microorganism in the microorganism-flowing area 102 and is decomposed by the microorganism. The concentration of the pollutant in the polluted area thus decreases and the polluted area is remedied. This construction enhances contacting efficiency between the microorganism and the pollutant, and improves remediation efficiency of the polluted area compared to directly introducing microorganisms to the polluted areas.

Upon introducing microorganisms to the polluted area 104 through area 102, it is preferable that the microorganism-flowing area surrounds the source of pollution to prevent escape of the pollutant.

In a region where the pollutant is flowing, the microorganism-flowing area may preferably be introduced to a region in such a manner as to ensure effective insulation of the pollutant. To this end, the pollutant-containing region to be treated should appropriately be selected according to the construction of the polluted area, species and concentration of the pollutant, among other factors.

The microorganism to be introduced to the microorganism-flowing area preferably contacts the pollutant in such an environment as to enable it to most efficiently decompose the pollutant. For this purpose and in general, a microorganism is cultivated in a liquid culture medium until it exhibits its maximum activity in an optimized culture medium. Even in such an optimized culture medium, however, when decomposing, for example, trichloroethylene or other chlorinated organic compounds, the microorganism is damaged by an intermediate product of the decomposition reaction, and hence its activity deteriorates with time. It is believed that the microorganism should be preferably introduced in the system in its anaphase of the logarithmic growth phase. The microorganism provides its maximum advantage in this phase from the viewpoint of activity and total cell number.

Accordingly, it is preferred that the microorganism is not allowed to remain stationary in the microorganism-flowing area 102 but is continuously supplied to be fresh and active. More preferably, the microorganism is supplied at the optimum stage of its life cycle, and a medium containing the same is transported so as to be present in the reaction zone or region in an active condition.

The raw material, pore size and other features of the diaphragm or membrane are not limited, and may preferably be selected based on the ability f the membrane to be permeable to the pollutant. When the pollutant has biotoxicity, for example, the concentration of pollutant which contacts the microorganism can be controlled by suppressing permeability of the diaphragm to the pollutant. The pore size may be zero (in other words the diaphragm may be nonporous), if the pollutant can sufficiently penetrate the material of the diaphragm.

The decomposition efficiency can also be controlled by regulating the surface area of the diaphragm. By way of illustration, in a diaphragm composed of a porous hollow fiber membrane, appropriate selection of the pore size of the hollow fiber controls the surface area relative to the fluid volume and hence regulates the concentration of the pollutant to be supplied to the microorganism. When employing a pollutant having a sufficiently high permeability, only a portion of the diaphragm can be composed of a material through which the pollutant can penetrate. The balance of the diaphragm can be composed of a material which is not penetrated by the pollutant. If desired, a membrane which is partially porous and partially non-porous or not penetrated by the pollutant can be employed.

As employed herein, unless otherwise defined, the term "fluid" includes, gas, liquid or a mixture of gas and liquid. The fluid containing the pollutant can be gaseous, a liquid or a mixture of a gas and a liquid. When such a fluid, such as a gas-liquid mixture containing pollutant is admixed in the passage, a gas or liquid not completely free of pollutant can possibly be discharged from the reaction field. This situation should be avoided.

In any case, the raw material, pore size and surface area of the diaphragm, the flow rate of the medium containing the microorganism or other factors should preferably be determined depending upon the decomposition activity of the microorganism, the concentration of the pollutant in the polluted medium, the toxicity of the pollutant or the like.

The microorganism to be used in this embodiment may be properly selected from known microbes having decomposition activity for a desired pollutant to be treated. Typical microorganisms having decomposition activity include:

*Welchia alkenophila* sero 5 (ATCC 53570; U.S. Pat. No. 4,877,736),

*Welchia alkenophila* sero 33 (ATCC 53571; U.S. Pat. No. 4,877,736),

Methylocystis sp. strain M (Agric. Biol. Chem., 53,2903 (1989); Biosci. Biotech. Biochem., 56,486(1992); ibid. 56,736(1992)),

*Methylosinus trichosprium* OB3b (Am. Chem. Soc. Natl. Meet. Dev. Environ. Microbiol., 29,365(1989); Appl. Environ. Microbiol., 55,3155(1989); Appl. Biochem. Biotechnol., 28,877(1991); Japanese Patent Laid-open No. 2-92274; Japanese Patent Laid-open No. 3-292970), Methylomonas sp. MM2 (Appl. Environ. Microbiol., 57,236(1991)),

*Alcaligenes denitrificans* subsp. *xylosoxidans* JE75 (Arch. Microbiol., 154,410(1990)),

*Alcaligenes eutrophus* JMP134 (Appl. Environ. Microbiol., 56,1179(1990)),

*Mycobacterium vaccae* JOB5 (J. Gen. Microbiol., 82,163 (1974), Appl. Environ. Microbiol., 54,2960(1989), ATCC 29678),

*Pseudomonas putida* BH (Journal of the Japan Sewage Works Association, 24,27(1987)), Pseudomonas sp. strain G4 (Appl. Environ. Microbiol., 52,383(1986); ibid. 53,949(1987); ibid. 54,951(1988), ibid. 56,1279(1990); ibid. 57,1935(1991); U.S. Pat. No. 4,925,802; ATCC 53617; this microorganism was first classified into *Pseudomonas cepacia*, but reclassified into Pseudomonas sp.),

*Pseudomonas mendocina* KR-1 (Bio. Technol., 7,282 (1989)),

*Pseudomonas putida* F1 (Appl. Environ. Microbiol., 54,1703(1988), ibid. 54,2578(1988)),

*Pseudomonas fluorescens* PFL12 (Appl. Environ. Microbiol., 54,2578(1988)),

*Pseudomonas putida* KWI-9 (Japanese Patent Laid-open No. 6-70753),

*Pseudomonas cepacia* KK01 (Japanese Patent Laid-open No. 6-227769),

*Nitrosomonas europaea* (Appl. Environ. Microbiol., 56,1169(1990)), and

*Lactobacillus vaginalis* sp. nov. (Int. J. Syst. Bacteriol., 39,368(1989), ATCC 49540) and so on.

Examples of the preferred microorganisms include strain J1 (FERM BP-5102), strain JM1 (FERM BP-5352), strain JM2N (FERM BP-5961) and the like when the pollutant is a halogenated aliphatic hydrocarbon (e.g., dichloroethylene, trichloroethylene or tetrachloroethylene) or an aromatic compound (e.g., phenol or toluene). Each of the strains J1, JM1 and JM2N has been described in following pending U.S. applications, No. 454515 (filed on May 30, 1995), No. 608808 (filed on Feb. 29, 1996) and No. 902941 (filed on Jul. 30, 1997), and the disclosure of the above mentioned pending application is incorporated wherein by reference. Further, each of the strains has been deposited under the terms and conditions of the Budapest Treaty under Accession Number FERM BP-5102 (strain J1), FERM BP-5352 (strain JM1) and FERM BP-5961 (strain JM2N). In addition, effective bacteria, microalgae, fungi, mycobacteria, protozoan and the like having pollutant degrading activity can be employed for this purpose.

Second Embodiment

Figure 2:
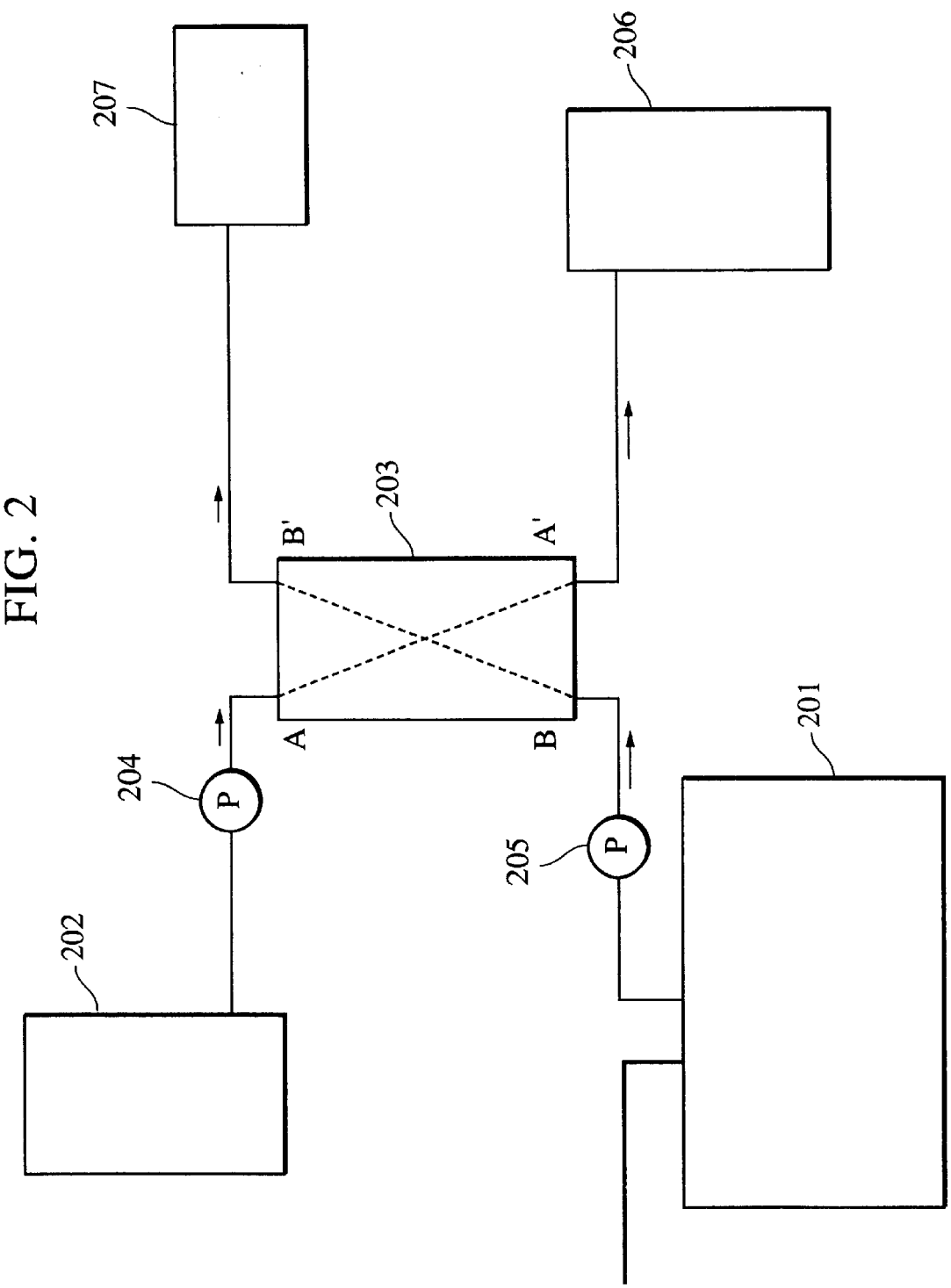
FIG. 2 is a schematic view illustrating a process for remedying a polluted medium and an apparatus used for the same according to a second embodiment of the present invention.

FIG. 2 is a schematic view illustrating a second embodiment of the remediation process for a polluted medium and an apparatus used for the same, according to the present invention. In FIG. 2, the reference numerals 201, 202 and 203 respectively show a reservoir for a first medium containing a pollutant; a reservoir for a second medium containing a microorganism capable of decomposing the pollutant; and a reactor in which the microorganism and the first medium indirectly contact each other by the interposition of a membrane through which the pollutant can penetrate and the microorganism cannot penetrate. The reference numeral 204 is a means, such as a pump, for supplying the second medium containing the microorganism from the reservoir 202 to the reactor 203; 205 is a means, such as a pump, for supplying the first medium from the reservoir 201 to the reactor 203; 206 is a tank for reserving the second medium contacted with the pollutant in the reactor 203; 207 is a tank for reserving the first medium treated in the reactor 203. This embodiment is different from the first embodiment in that the first medium containing the pollutant is caused to flow.

Figure 3:
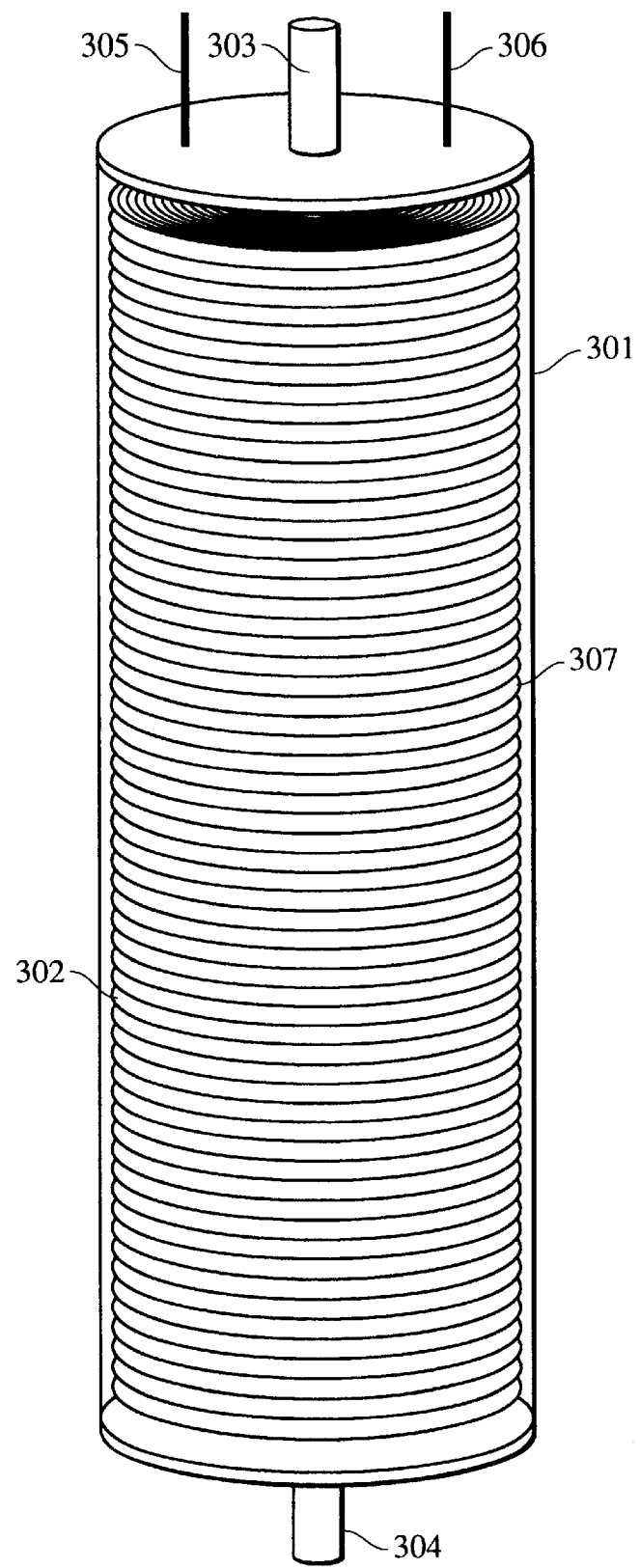
FIG. 3 is an enlarged cross-sectional view of an embodiment of the reactor shown in FIG. 2.
Figure 4:
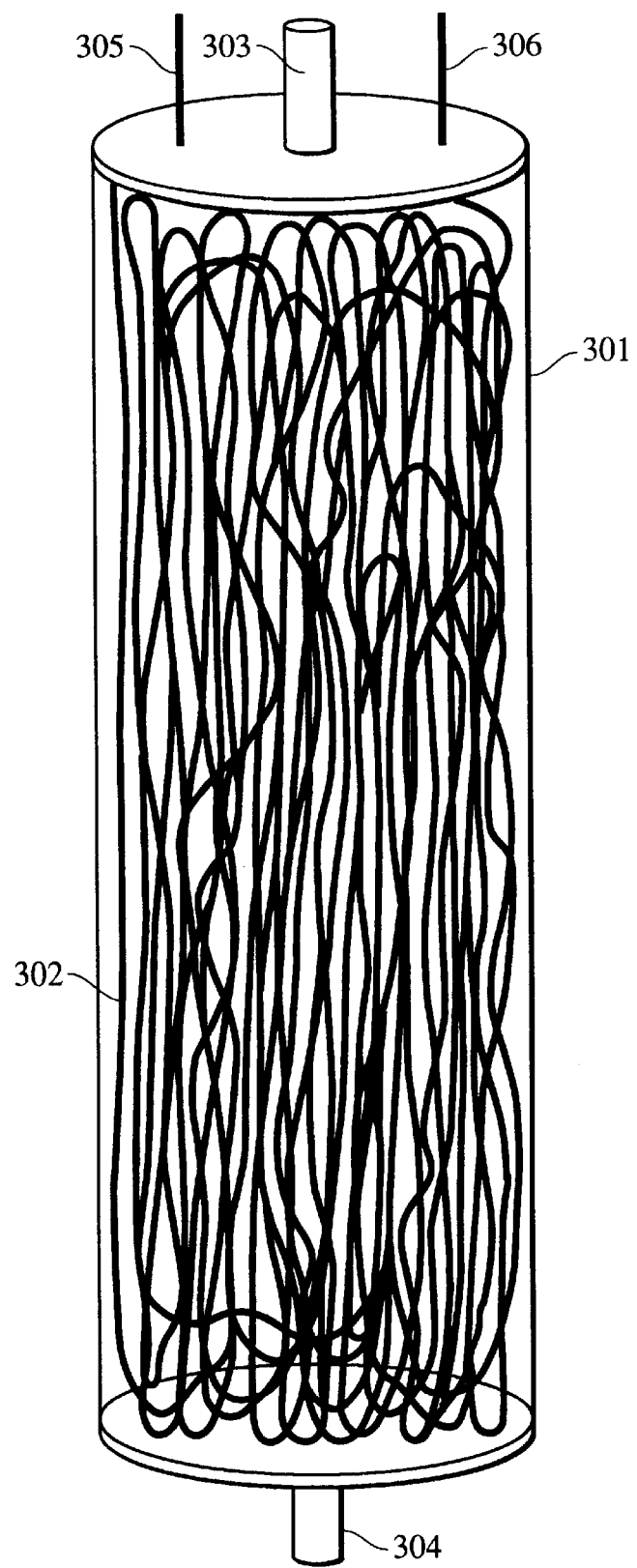
FIG. 4 is an enlarged cross-sectional view of another embodiment of the reactor shown in FIG. 2.

FIGS. 3 and 4 are each an enlarged cross sectional view of a different embodiment of the reactor 203 shown in FIG. 2. In FIGS. 3 and 4, the reference numeral 301 is a tubular case having a first opening 303 and a second opening 304. Of the first and second openings, one is used as an inlet of the first medium containing the pollutant to the tubular case, and the other is used as an outlet of the same, and hence the tubular case forms a passage for the first medium. The reference numeral 302 is a tubular member encased in the tubular case 301. This tubular member has a first opening 305 and a second opening 306. The outer wall 307 of the tubular member 302 is composed of a membrane through which the microorganism cannot penetrate and the pollutant can penetrate. The tubular member 302 constitutes a passage for the second medium containing the microorganism having decomposing activity on the pollutant.

In this embodiment, the first medium and the second medium, while respectively flowing, contact each other through the interposition of the outer wall 307 of the tubular member 302 inside the tubular case 301. The pollutant penetrates through the outer wall 307 and contacts the microorganism within and is decomposed. The tubular case shown in FIG. 3 is composed in such a manner that a fluid flowing in the tubular member encased in the chamber flows in a given direction, for example, from the first opening 303 to the second opening 304. In the tubular case shown in FIG. 4, there is no regularity between the direction of the fluid flowing in the tubular member encased in the chamber, and the direction of the first medium flowing in the tubular case.

Since the decomposing activity of the microorganism decreases with the volume of pollutant treated, the decomposing activity fluctuates between the upstream region and downstream region of the tubular member 302. In other words, the decomposing activity is higher for the microorganism in the upstream region of the tubular member 302, which is initially introduced into the tubular member. Using the apparatus shown in FIG. 3 and also controlling the flowing directions of the first and second media enhance higher remediation of the polluted medium with the aid of distribution (difference) of the decomposing activity of the microorganism in the tubular member. This construction will be described below as a fourth embodiment of the invention.

In the apparatus shown in FIG. 4, as the microorganism flows back and forth many times, the degrading efficiency accords with a mean value of the decomposing activities of the microorganism. This construction is advantageously used for treatment of a first medium containing the pollutant in a comparatively low concentration.

Third Embodiment

Figure 5:
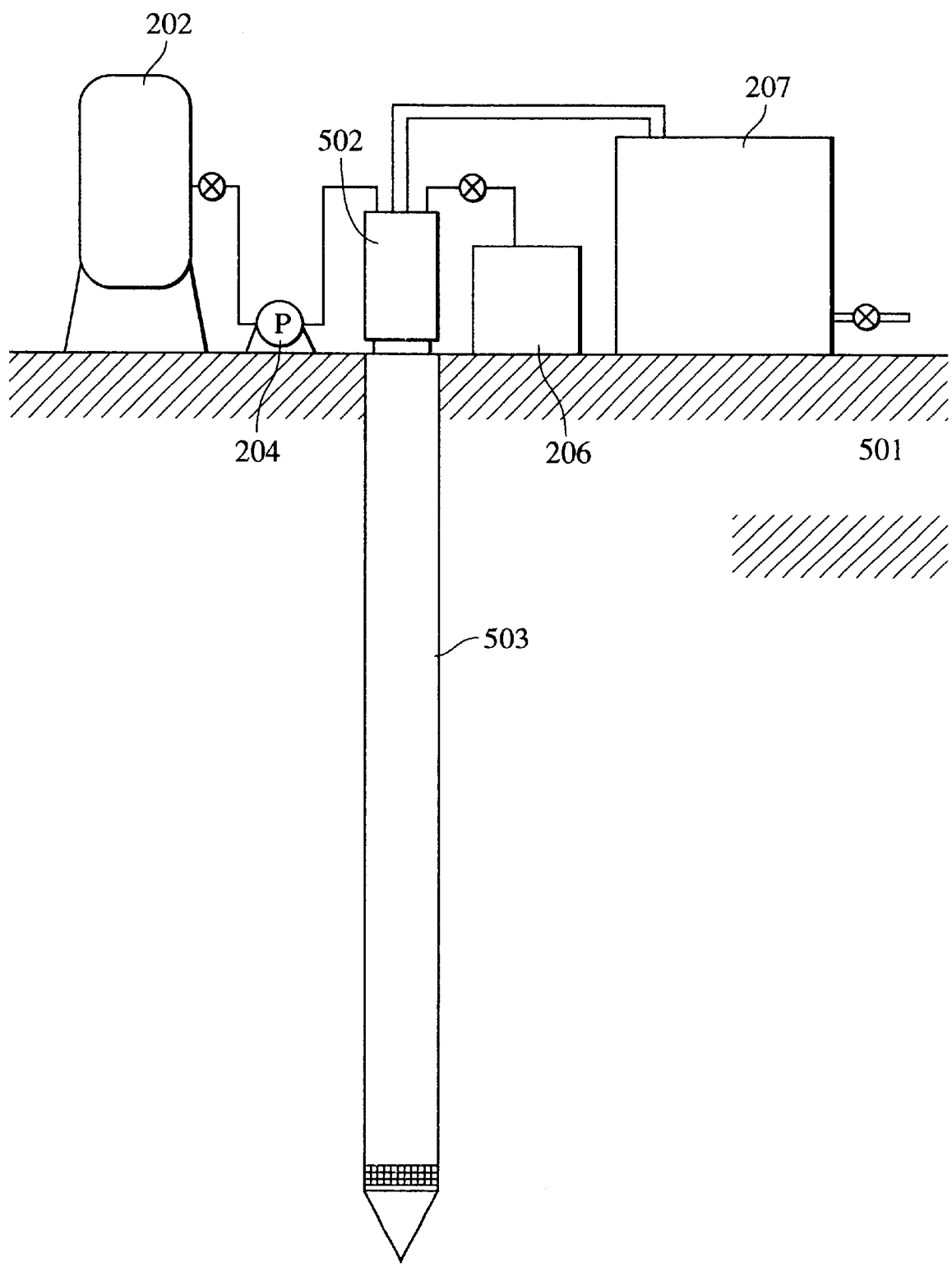
FIG. 5 is a schematic view illustrating a construction of an apparatus for remedying soil according to an embodiment of the present invention.

The aforementioned second embodiment is applicable to a process for remedying in place polluted soil. FIG. 5 is a schematic view illustrating such a process. In FIG. 5, the reference numeral 501 represents a polluted soil region; and 502 is a suction pump for collecting either the pollutant in the soil region 501 or a medium containing the pollutant, so as to conduct the first medium containing the pollutant to a reactor 503. In reactor 503 a reaction occurs between the first medium containing the pollutant in the soil and the microorganism.

Figure 6:
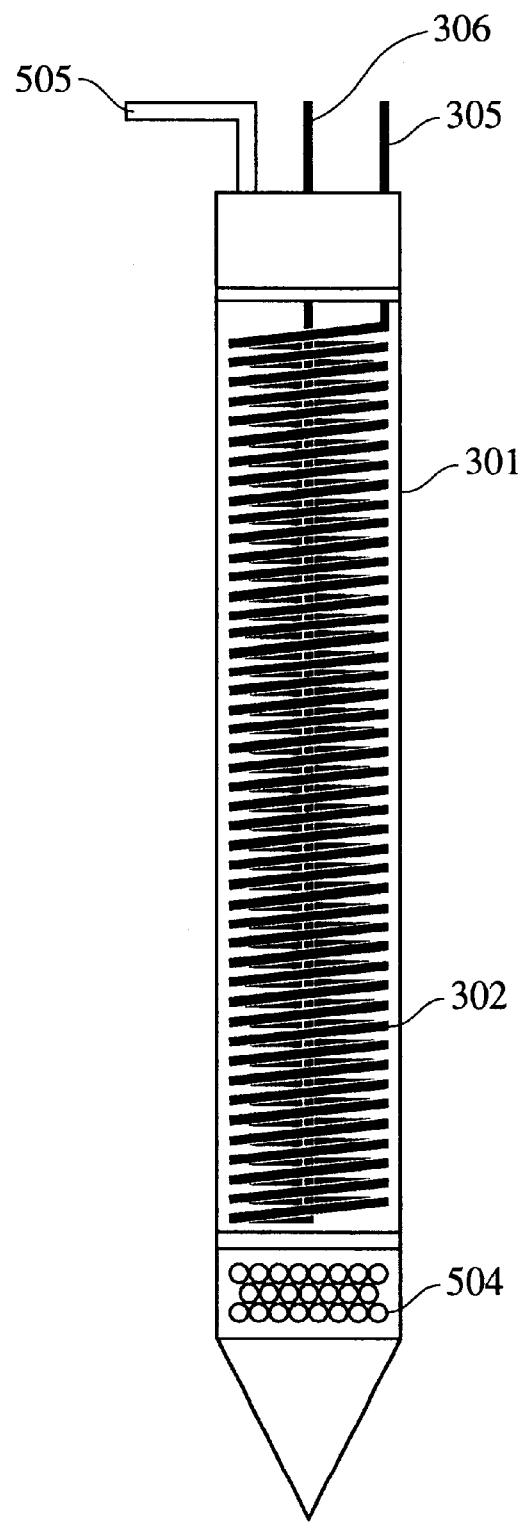
FIG. 6 is a schematic cross-sectional view of an embodiment of the reactor of the apparatus shown in FIG. 5.
Figure 7:
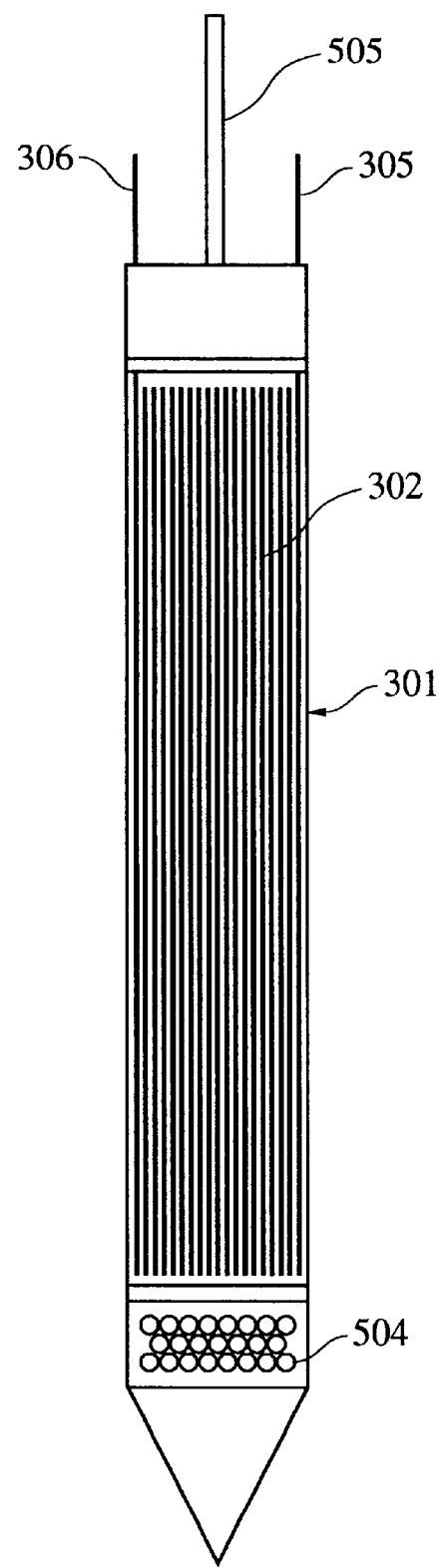
FIG. 7 is a schematic cross-sectional view of another embodiment of the reactor of the apparatus shown in FIG. 5.

FIGS. 6 and 7 are each an enlarged cross-sectional view illustrating a different embodiment of the reactor 503 shown in FIG. 5. These embodiments respectively include a tubular member 302 which is housed in a tubular case 301, as illustrated in FIG. 3 or 4. The tubular case 301 has a pencil-shaped exterior so as to readily penetrate the soil region. At the bottom of the tubular case 301 an opening (a second opening) 504 is provided for evacuating or aspirating the first medium containing the pollutant. The first medium containing the pollutant is aspirated by the suction pump 502 shown in FIG. 5 through the second opening 504 and flows toward the first opening 505, and hence contacts, through the interposition of the membrane, the second medium containing the microorganism flowing in the tubular member 302 housed in the tubular case 301. The pollutant in the first medium penetrates the wall of the tubular member 302 and contacts the microorganism within, and hence is decomposed by the same.

Fourth Embodiment

The fourth embodiment according to the present invention is a process for treating a polluted medium and an apparatus used for the same.

Figure 8:
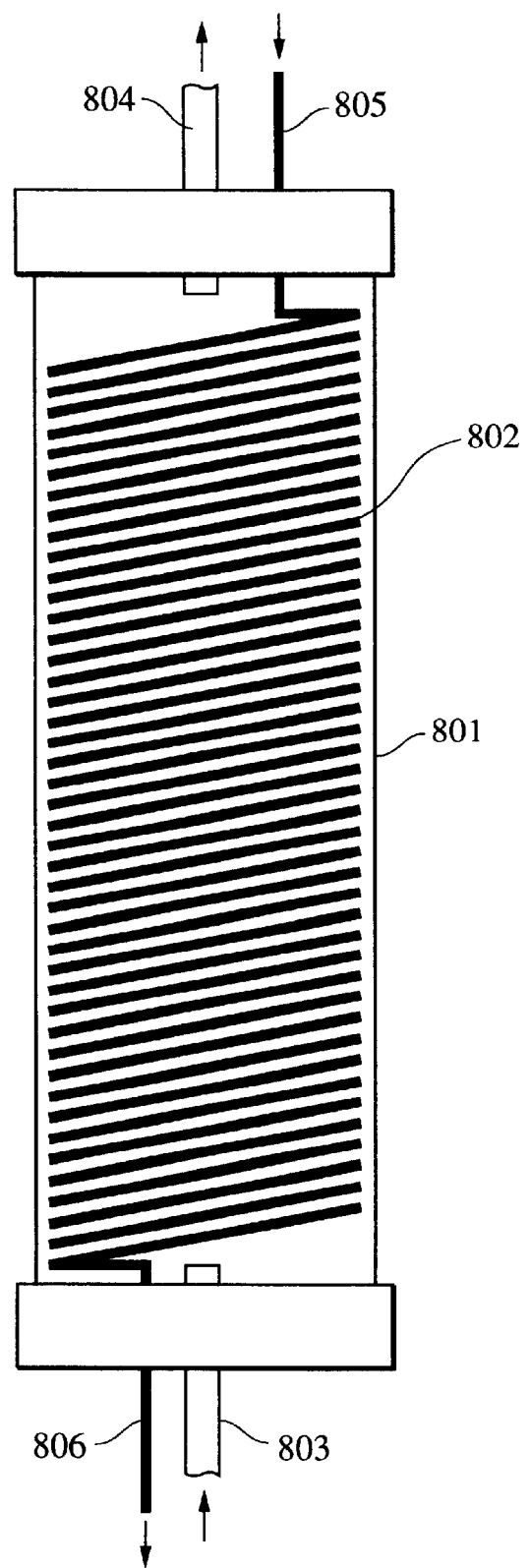
FIG. 8 is an enlarged cross-sectional view of a still another embodiment of the reactor shown in FIG. 2.

FIG. 8 is an enlarged cross-sectional view illustrating another embodiment of the reactor 203 of FIG. 2, in which the reference numeral 801 is a tubular case constituting a passage for the first medium and having at each end an opening 803 as an inlet and an opening 804 as an outlet, each for the first medium. The reference numeral 802 is a tubular member composed of a membrane as its outer wall through which the pollutant can penetrate and the microorganism cannot penetrate. This tubular member has first and second openings 805 and 806 respectively forming a passage for the second medium flowing, for instance, from the first opening 805 down to the second opening 806. The tubular member 802 is coiled and encased in the tubular case 801 in such a manner that the second medium, as introduced into the tubular member 802 via the inlet 805, flows in a direction from the outlet 804 down to the inlet 803 in the tubular case 801, each for the first medium.

The first medium containing the pollutant is introduced from a first reservoir not shown to the tubular case 801 via the inlet 803 using a supply means such as a pump. The second medium containing the microorganism, which is reserved in a second reservoir, not shown, and enhanced in the decomposing activity for the pollutant, is introduced via the opening 805 to the tubular member 802 using the supply means. The first medium and the second medium respectively flow in opposite directions to each other, and contact each other indirectly through the interposition of the outer wall of the tubular member 802. This construction generates a gradient of the microorganism's decomposing activity for the pollutant from upstream to downstream of the tubular member 802. To be more specific, the pollutant-decomposing activity of the microorganism introduced into the tubular member 802 is maximized immediately after introduction, and decreases in the downstream direction, since the second medium containing the microorganism flows downstream and decomposes the pollutant in the first medium penetrated through the membrane.

Using the gradient of the pollutant-decomposing activity, this embodiment achieves still more remediation of the first medium. This embodiment provides a system in which the first medium containing the pollutant in a high concentration and the microorganism having a comparatively minimum pollutant-decomposing activity contact each other in the neighborhood of the first-medium inlet 803 in the tubular case 801, and the first medium containing the pollutant in a relatively low concentration and the microorganism having a maximum pollutant-depolluting activity contact each other in the neighborhood of the first-medium outlet 804 in the tubular case 801. In this system, the pollutant concentration in the first medium decreases less in magnitude than the embodiment where the first and second media flow in the same direction. Therefore, in this system the concentration of pollutant can stably and continuously decrease.

As the microorganism used in this embodiment, those capable of decomposing the pollutant are preferable. Since the decomposition activity is deteriorated downstream of the flow of the microorganism-containing medium, use is more advantageously made of microorganisms having such a pollutant-decomposing activity to decrease the pollutant concentration, even when the decomposing activity is being deteriorated.

<Description of the First Medium>

The first medium containing the pollutant may be a gas, a liquid, or a mixture of a gas and a liquid (a gas-liquid mixture). When the first medium is a gas-liquid mixture, it is preferable to cause the first medium to flow in such a manner as not to be stirred in the passage, that is, not to disturb the counterflow against the second medium. This uniform flow will further decrease the pollutant concentration in the first medium or shorten the reaction time. In any case, the raw material, pore size and surface area of the diaphragm, the flow rates of the medium containing the microorganism and of the medium containing the pollutant or others should be preferably determined depending on the decomposing activity of the microorganism, concentration of the pollutant in the polluted medium, toxicity of the pollutant or the like.

<Description of the Second Medium>

In general, a microorganism is cultured in a liquid culture medium and exhibits its maximum pollutant-decomposing activity in an optimized culture medium. It is, therefore, preferable and advantageous in this embodiment that the microorganism having a pollutant-decomposing activity contacts the pollutant in an environment that enables the microorganism to exhibit its activity most efficiently. Accordingly, the second medium preferably comprise a liquid medium, in particular, an optimized liquid medium for the microorganism.

The microorganism is preferably used in the anaphase of logarithmic growth phase at the time it decomposes the pollutant. The microorganism is advantageously supplied to the reaction zone, and is caused to flow in the second medium and is retained in the zone as long as it remains active. Therefore, a reservoir for the second medium should advantageously be an incubator for the microorganism in order to control the pollutant-decomposing activity of the microorganism, for example.

<Description of Membrane Constructing Outer Wall of Tubular Member>

The membrane constituting the outer wall 307 of the tubular membrane 302 is preferably a membrane through which the pollutant can pass and the microorganism cannot pass. If the membrane only satisfies this requirement, its material, pore size and other parameters are not restricted and may be selected according to the size of the pollutant to be decomposed and the microorganism to be used. By way of illustration, the molecular size (diameter) of trichloroethylene is on the order of Angstroms, and the size of strain JM1 (FERM BP-5352) having decomposing activity for trichloroethylene is about 0.5 to 1 $\mu$m. In this case, a hollow fiber membrane or the like having a pore size can advantageously be employed as the tubular member 302 such that trichloroethylene can penetrate the outer wall and the microorganism cannot. The decomposition efficiency can also be controlled by adjusting the surface area of the diaphragm. For instance, when a porous hollow fiber membrane is used as the diaphragm, selection of the pore size of the hollow fiber membrane determines the surface area relative to the fluid volume, and hence controls the pollutant concentration. As the hollow fiber membrane, those composed of fluororesins, polysulfones or celluloses for example may be used.

If the pollutant has sufficient permeability to the raw material of the membrane, use may be made of a hollow fiber membrane which is nonporous. By way of example, TCE and the like can penetrate a hollow fiber membrane composed of a polysulfone even in the absence of pores. In this embodiment the pollutant concentration may be controlled by making the diaphragm partially composed of a material pervious to the pollutant.

When the pollutant or its intermediate product during the decomposition process has biotoxicity, the pollutant concentration may be controllable by employing a membrane having a relatively low permeability by the pollutant.

This embodiment is advantageously when the first and second media flow respectively in the opposite direction to each other and the pollutant concentration is lower than when the two media flow in the same direction. This condition depends, in part, on the microorganism to be used, initial concentration of the pollutant in the first medium, species of the first and second media, contacting time of the first and second media (e.g., a length of reaction zone or field, flow rates of the first and second media) and characteristics of the membrane interposed between the first and second media. Practical examples will be described below of the embodiments in which an opposed flow of the first medium and the second medium gives superior advantages to a unidirectional flow.

By way of illustration, when remediation was conducted as follows hereafter, trichloroethylene in the first medium in the neighborhood of the outlet of the tubular case was practically nondetectable. The first medium was air containing 100 ppm of trichloroethylene; the second media was a culture medium containing $2.3 \times 10^6$ cell/mL of the microbial strain JM1 (FERM BP-5253) obtained by incubating the microorganism in M9 Medium having the composition below for 3 days; the tubular case was a glass column [30 mm×1000 mm (inner diameter×length)]; the tubular member was a hollow fiber membrane composed of a fluororesin [30 mm×4 mm×3 mm (length×outer diameter×inner diameter); trade name: Poreflon Filter Tube; Flon Kogyo K.K.]; a flow rate of the first medium was 3 liters/hour and a flow rate of the second medium in an opposite direction to the first medium was 5.9 ml/hour. To the contrary, when the first and second media were transported in the same direction, the TCE concentration in the first medium in the neighborhood of the outlet of the glass column converged to about 15 to 30 ppm, and it was difficult to lower the concentration below this value. Accordingly, it is preferable and advantageous to cause the first and second media to flow in opposite directions to each other under the above embodiment.

[Composition of M9 Medium]

| | |
|---|---|
| Na$_2$HPO$_4$ | 6.2 g/l |
| KH$_2$PO$_4$ | 3 g/l |
| NaCl | 0.5 g/l |
| NH$_4$Cl | 1 g/l |
| Sodium glutamate | 5 g/l |
| Water | balance |

In another embodiment, when pollution was remedied as follows, trichloroethylene in the first medium in the neighborhood of the outlet of the tubular case was practically nondetectable. The first medium was air containing 200 ppm of trichloroethylene; the second medium was a culture medium containing $8.4 \times 10^8$ cell/ml of *Pseudomonas cepacia* KK01 (FERM BP-4235) obtained by incubating the microbe in a M9 Media further comprising 0.1% of yeast extract and 300 ppm of phenol for about 50 hours; the tubular case was a glass column [30 mm×1000 mm (inner diameter×length)]; the tubular member was a hollow fiber membrane composed of a fluororesin [30 mm×4 mm×3 mm (length×outer diameter×inner diameter); trade name: Poreflon Filter Tube; Flon Kogyo K.K.]; a flow rate of the first medium was 1.8 l/hr and a flow rate of the second medium was 4.9 ml/hr in a direction opposite to the first medium. To the contrary, when the first and second media flowed in the same direction, the TCE concentration in the first medium in the neighborhood of the outlet of the glass column was reduced to about 45 ppm, but it was difficult to lower the concentration below that value. Accordingly, it is preferable to cause the first and second media to flow in the opposite directions to each other under the above-mentioned conditions.

As a still further example, the pollution was remedied as follows, and trichloroethylene in the first medium in the neighborhood of the outlet of the tubular case was in a concentration not higher than 0.02 ppm. The first medium was water containing 20 ppm of trichloroethylene; the second media was a culture medium containing $1.3 \times 10^9$ cell/ml of the strain JM1 (FERM BP-5253) obtained by incubating the microorganism in a M9 Medium further comprising 0.5% of sodium glutamate for about 48 hours; the tubular case was a glass column [45 mm×500 mm (inner diameter×length)]; the tubular member was a hollow fiber membrane composed of a fluororesin [30 mm×4 mm×3 mm (length×outer diameter×inner diameter); trade name: Poreflon Filter Tube; manufactured by Flon Kogyo K.K.]; a flow rate of the first medium was 50 ml/hr and a flow rate of the second medium was 10 ml/hr in the opposite direction. To the contrary, when the first and second media were caused to flow in the same direction, the trichloroethylene concentration was reduced to about 0.2 ppm. Therefore, it is preferable and advantageous to cause the first and second media to flow in opposite directions to each other under the aforementioned conditions.

The second, third and fourth embodiments mentioned above illustrate a construction where the tubular member 302 for the second medium is a single passage. Plural tubular members can, however, be employed in the tubular case so as to improve the remediation efficiency of the first medium. Control of the flow rate of the microorganism-containing medium in the tubular member 302 results in a more minute regulation of decomposing activity distribution in the reactor, and hence allows more efficient action to be taken when fluctuations of the pollutant concentration in the polluted fluid occur. Thus, the decomposing activity of the microorganism can be fully utilized to decompose the pollutant completely.

In the above-mentioned second, third and fourth embodiments, the second medium flows in the tubular member 320. However, if desired, the first medium may flow in the tubular member 320. When the first medium contains a large quantity of particles, or when a fine hollow fiber membrane, for example, is used as the tubular member 302, the hollow fiber membrane may plug. It is preferred to defeat plugging which reduces process efficiency.

In the constructions of the above-mentioned second, third and fourth embodiments, the microorganism is cultivated in the reservoir 202 shown in FIG. 2 as an incubator, and then introduced into the reactor 203. A construction may also be employed in which the microorganism is not cultivated in the reservoir 202, but in an incubator separately provided, and the resultant culture medium reserved in reservoir 202. The supply means 204 and 205 used initiate flow of the first and/or second medium include means using hydrostatic pressure, for instance. In this aspect, the first medium is reserved temporarily in the reservoir 201. This is not essential, but is preferably employed in the above-mentioned embodiments, since the reservoir 201 inhibits or prevents fluctuations of concentration or volume of the polluted medium from adversely affecting the treatment of the polluted medium in the reactor 203.

For transporting the medium containing the microorganism in the tubular member, the pressure of the medium is preferably lower than that of the medium containing the pollutant so as to inhibit or prevent plug-up of the membrane interposed between the two media. When the pollutant is a halogenated aliphatic hydrocarbon (e.g., trichloroethylene), a mass exchange (mass transfer) efficiency can be improved by employing a diaphragm formed of a hydrophobic material and increasing the pressure of the polluted medium. In this instance, the contact efficiency can be still further improved by treating the medium to exclude particles that cause plug-up, for example by eliminating such particles beforehand, so as to increase the pressure of the polluted medium.

As described above, the various embodiments according to the present invention respectively provide efficient remediation of a medium containing a pollutant with the aid of a microorganism. They also enhance a reaction rate of the pollutant with the microorganism so as to shorten the time required for remediation. They achieve higher remediation of the medium containing the pollutant in a shorter time.

The present invention will now be described in more detail with reference to the following examples.

EXAMPLE 1

Figure 9:
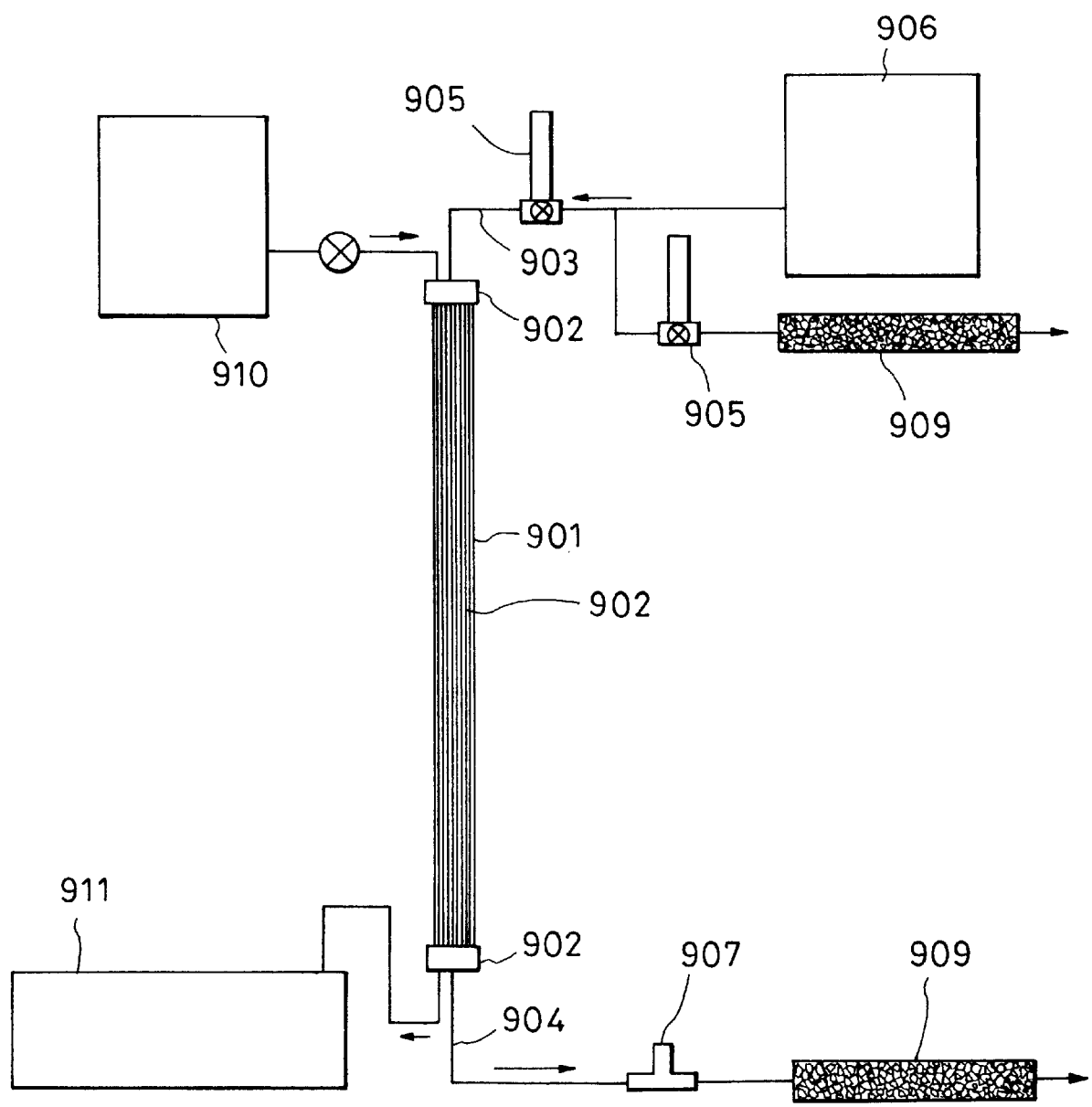
FIG. 9 is a schematic view illustrating an apparatus for remedying a polluted medium used in Example 1.

The apparatus shown in FIG. 9 was set up according to the following procedure:

For the tubular case 901 constituting a reactor 203 a glass column (inner diameter 30 mm, length 1000 mm) having screwed openings at each end, and two screw caps 902 was employed. Inside the screw caps 902, Teflon-coated rubber packings were inserted, centers of the caps and packings were needle-holed and 0.7 mm-Teflon tubes 903,904 were led therethrough to form the first and second openings of the tubular case 901.

One end of the Teflon-tube 903 was connected via a flow meter 905 to a standard gas generator 906 (Permeater PD-1B, manufactured by Gastech Inc.), and one end of the other Teflon tube 904 was connected to a sampling port 907 and a trap 909 filled with activated carbon.

Next, a Poreflon Filter Tube (outer diameter 4 mm, inner diameter 3 mm; Flon Kogyo K.K.) as a tubular member 902 was inserted about 30 m into the column as shown in FIG. 4, both ends of the tube were led out of the column through holes opened in the packings and screw caps 902, and one end was connected to a tank (a reservoir) 910 for supplying a second medium containing a microorganism and the other was connected to a waste tank 911.

The reservoir 910 for the second medium was filled with a culture medium containing a microorganism having a decomposing activity. A fresh and living culture medium was resupplied to the reservoir every day. As the microorganism, strain JM1 (FERM BP-5352) was employed, in a cell concentration of $1.2 \times 10^8$ cell/ml after cultivating for 3 days. The medium composition was as follows.

| | |
|---|---|
| Na$_2$HPO$_4$ | 6.2 g/l |
| KH$_2$PO$_4$ | 3 g/l |
| NaCl | 0.5 g/l |
| NH$_4$Cl | 1 g/l |
| Sodium glutamate.H$_2$O | 10 g/l |
| Water | balance |

The standard gas generator 906 was supplied with trichloroethylene (TCE) and adjusted to supply an air containing 100 ppm of TCE to the column. The flow volume of the standard gas was regulated to 3 l/hr with the flow meter 905.

The column was then fixed erect on a tripod, and the flow rate of the second medium was controlled to 17.7 ml/hr by adjusting the heights of the reservoir 910 for the second medium and of the waste tank 911. This flow rate was such that the microorganism passed through the Poreflon Filter Tube in the column in about 0.5 day.

Figure 10:
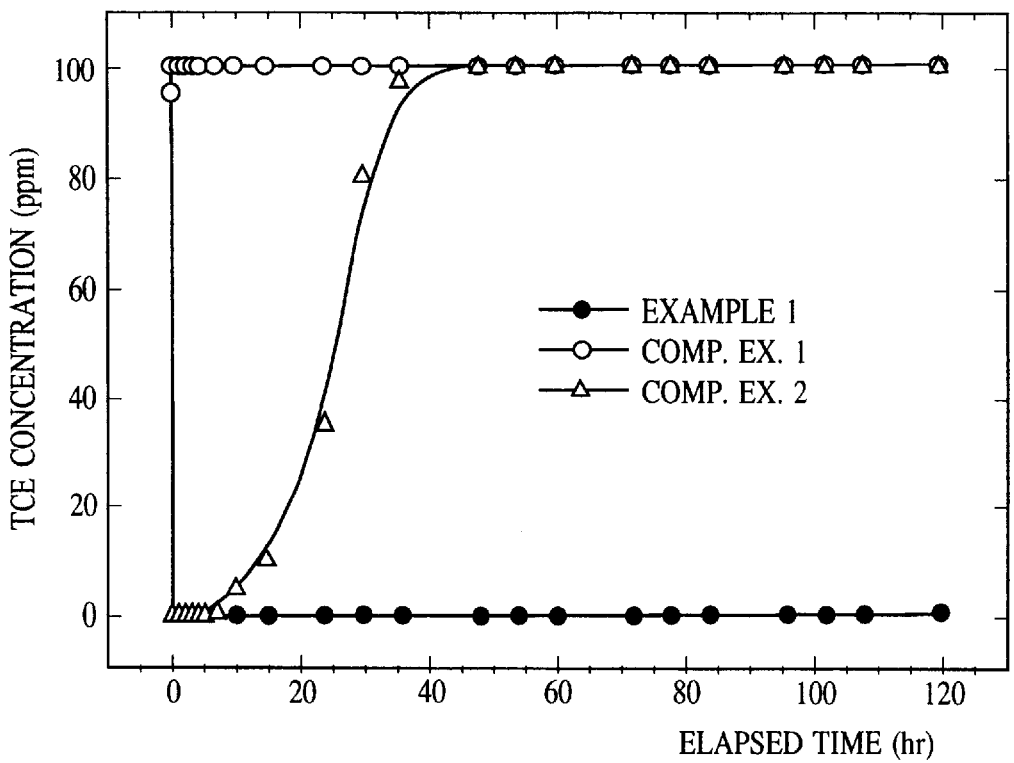
FIG. 10 is a graph showing changes with time of TCE concentrations in polluted media in Example 1, and Comparative Examples 1 and 2.

Next, the culture medium containing the microorganism was supplied to the Poreflon Filter Tube, and, after completion of charging the culture medium fully in the tube, the TCE-containing air was introduced. The TCE concentration in the air was monitored on the sampling port 907 provided on the Teflon tube 904, and measured by a gas chromatography equipped with a flame ionization detector (FID) (trade name: GC14B; manufactured by Shimadzu Corp., Japan). TCE was not detected in 5-days continuous measurement, as shown in FIG. 10.

Comparative Example 1

The measurement of TCE concentration was conducted for 5 days in the same manner as in Example 1, except that only a culture medium without microorganisms was employed in reservoir 910. As is apparent from FIG. 10, TCE began to be detected at the time when the air inside the column was replaced. This indicates that TCE was decomposed by the microorganism in Example 1.

Comparative Example 2

The TCE concentration in the air flow out of the Teflon tube 904 was monitored and measured for 5 days according to the same procedure as Example 1, except that the culture medium was not resupplied with fresh stock after it was initially charged to the Poreflon Filter Tube 902. TCE began to be detected about 10 hours into the test, and in 17 hours the apparatus nearly lost its remediation activity.

EXAMPLE 2

A test was carried out in the same manner as in Example 1, except instead of the standard gas generator 906, a tank containing 40 l of a 5-ppm TCE aqueous solution was employed to supply solution to the column at a flow rate of 0.25 l/hr. To supply the TCE solution to the column a roller pump (RP-MRF1; manufactured by FURUE SCIENCE Co., Ltd.) was employed. The treated water discharged from the Teflon tube 904 was sampled by sampling port 907, and subjected to the measurement in a conventional manner with an electron capture detector (ECD) (trade name: GC14B; manufactured by Shimadzu Corp., Japan). The test results are set forth in FIG. 11.

Figure 11:
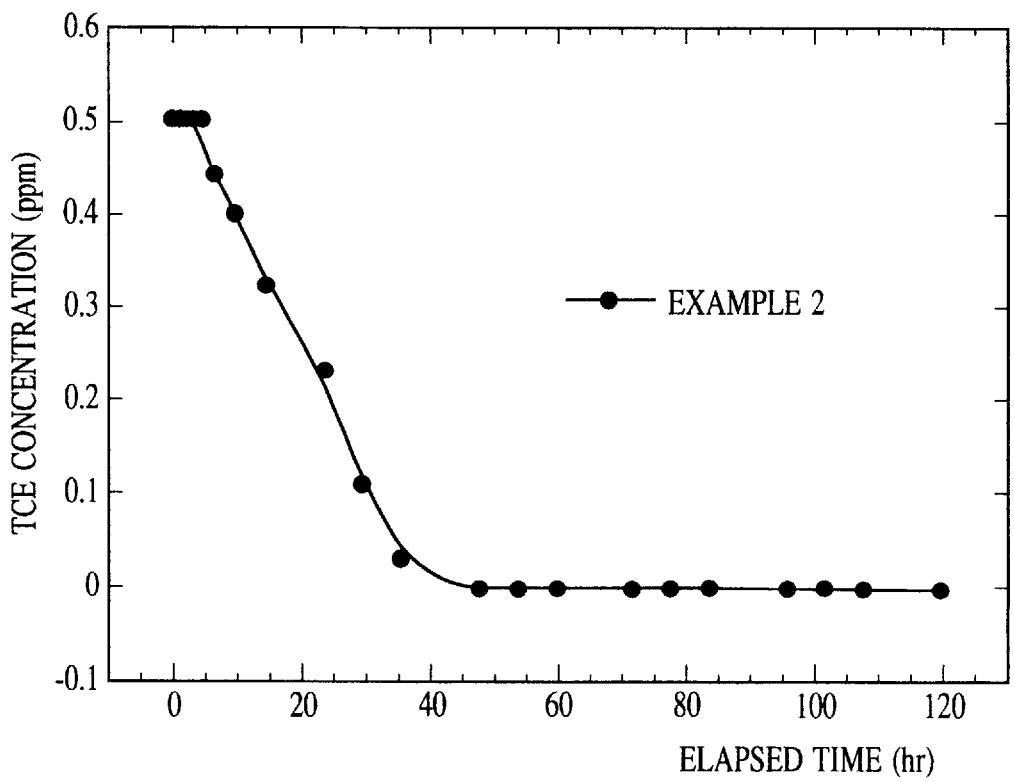
FIG. 11 is a graph showing a change with time of a TCE concentration in a polluted medium in Example 2.

As is apparent from FIG. 11, the concentration of the polluted water gradually decreased with a decreasing TCE aqueous solution in the tank for supply, since TCE in the solution was evoluted to a gas phase in the tank. TCE was undetected in the latter half of the test as completely decomposed, although it had been detected after about 30 hours from initiation of the test as not completely decomposed. It was found that this test system provides decomposition of TCE in a concentration of up to about 4.5 ppm.

EXAMPLE 3

Figure 12:
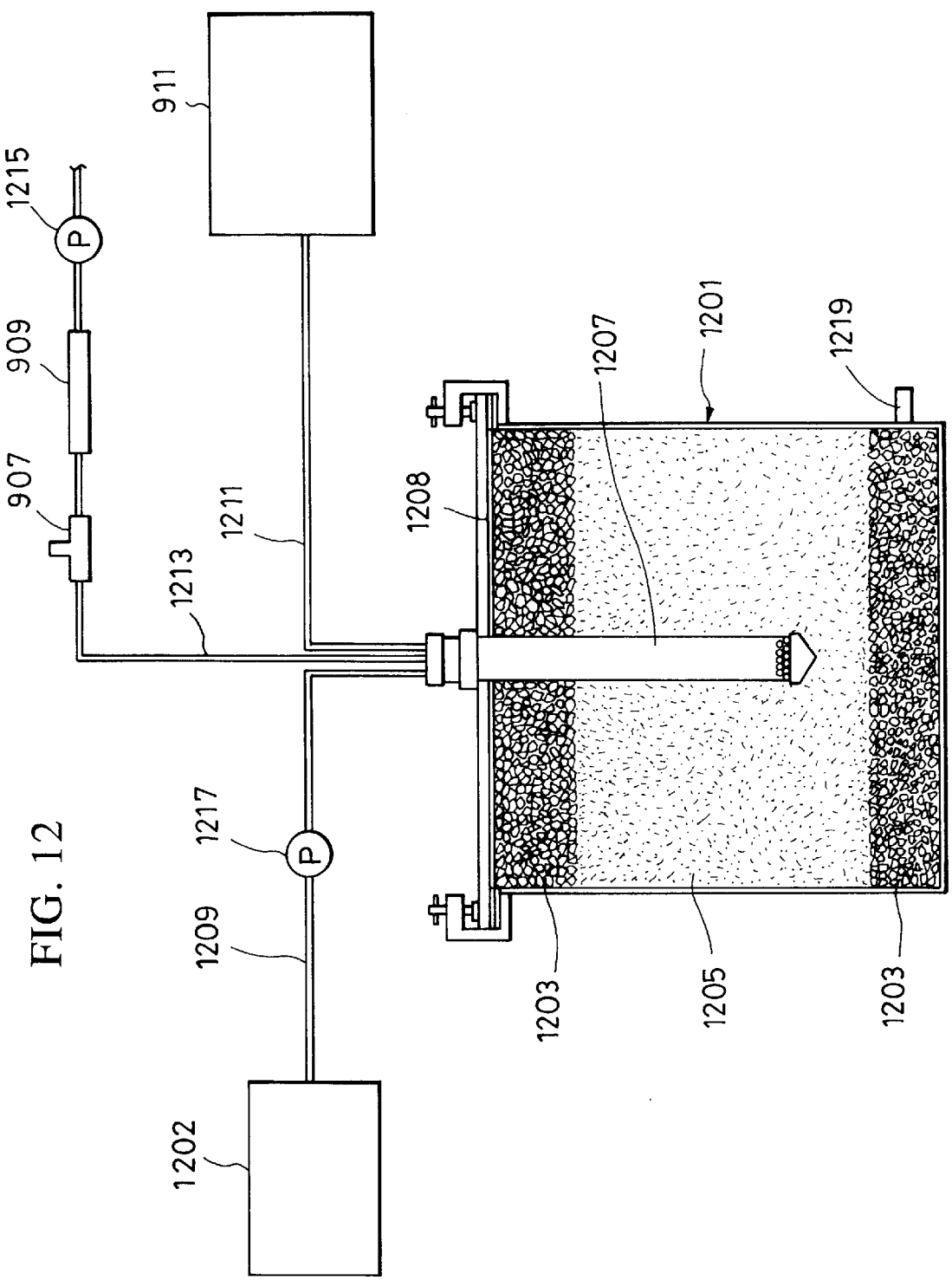
FIG. 12 is a schematic view illustrating a construction of an apparatus for remedying soil used in Example 3.

A test soil was prepared in a stainless experimental tank 1201 (inner diameter: 36 cm, inner depth: 36 cm), as shown in FIG. 12. First, a scabbled rubble layer (mean scabbled diameter: 0.7 cm) was formed about 6 cm in thickness in the bottom of the test tank 1201. Next, four roller compressed layers (average wet consolidation degree: 1.8 g/cm$^3$) each about 6 cm in thickness were formed on the scabbled layer, as a fine sand layer 1205 (average moisture content: 13%). On the top of these layers, another scabbled rubble layer 1203 was formed about 6 cm in thickness in the same manner as in the lowest layer. During the preparation of this sandy soil, a stainless pile 1207 (inner diameter 30 mm, length 30 cm) was embedded in such a manner that the top of the pile was 20 cm into the soil. This pile 1207 had the same construction as the device shown in FIG. 7. To be more specific, the pile had an opening at one end so as to aspirate the pollutant in the soil from an opening at the other end, and it housed a 10-m hollow fiber membrane composed of a fluororesin (trade name: Poreflon Filter Tube; outer diameter: 4 mm, inner diameter: 3 mm; manufactured by Flon Kogyo K.K.) as the tubular member 302 (not shown). The hollow fiber membrane 302 was housed in the pile 1207 in such a manner that the flow direction of the second medium was random relative to that of the first medium, as illustrated in FIG. 4. The experimental tank 1201 was then sealed with an iron lid 1208.

Next, one end of the tubular member 302 housed in the pile was connected via a Teflon tube 1209 to a reservoir 1202 for a second medium containing a microorganism, and the other end was connected via a Teflon tube 1211 to a waste tank 911. To the opening of the pile 1207 that was not embedded in the soil, a Teflon tube 1213 was connected through the interposition of an aspirating pump 1215, so as to aspirate the first medium containing the pollutant from the soil via the pile 1207. On the Teflon tube 1213, a sampling port 907 and an activated carbon trap 909 were connected.

The microorganism was cultivated in a reservoir tank 202 (not shown) in the same manner as in Example 1, and the resulting culture medium was supplied to the tubular member 302 encased in the pile 1207 at a flow rate in the tubular member of 9.2 ml/hr. Twelve hours later, the culture medium was charged to the tubular member 302, and then 150 ml of an aqueous solution containing 100 ppm of trichloroethylene was injected to the scabbled rubble layer 1203 through a stainless pipe 1219 provided in the bottom of the experimental tank 1201. The stainless pipe was closed, and the injected solution containing trichloroethylene was left standing for 5 hours. The pump 1215 was then run (flow rate: 3 l/hr) to flow air containing trichloroethylene in the soil into the pile, so as to contact the same with the culture medium through the interposition of the Poreflon Filter Tube.

Figure 13:
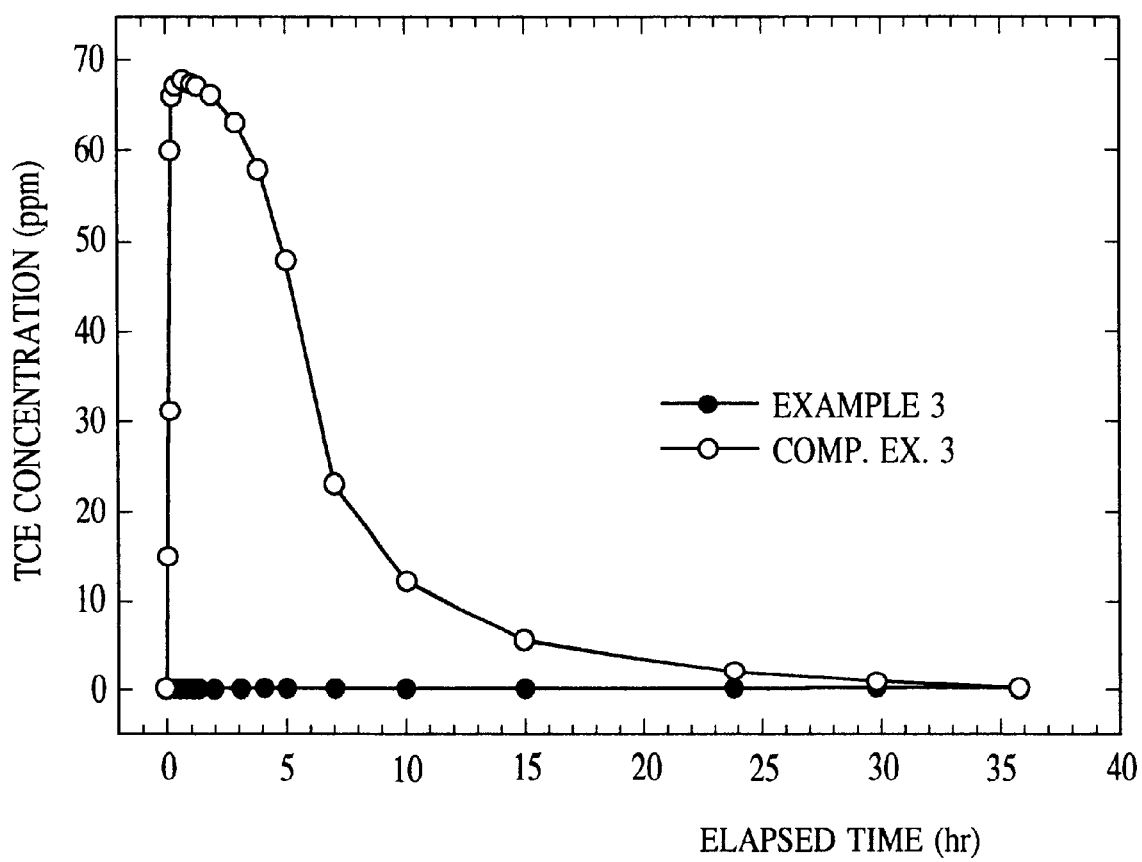
FIG. 13 is a graph showing changes with time of TCE concentrations in polluted media in Example 3 and Comparative Example 3.

The air exhausted from the top of the pile was periodically sampled via the sampling port 907, and the TCE concentration in the air was determined by gas chromatography equipped with FID (trade name: GC14B; manufactured by Shimadzu Corp., Japan). As a result, the TCE concentration in the gas phase was maintained not higher than 0.01 ppm as shown in FIG. 13.

Comparative Example 3

First, an experimental tank with its support equipment was prepared in the same manner as in Example 3.

Next, tap water was supplied to the tube in the pile for remediation instead of the culture medium containing the pollutant-decomposing microorganism. After supplying tap water for 24 hours, 150 ml of an aqueous solution containing 100 ppm of trichloroethylene as the pollutant was injected into the scabbled rubble layer in the bottom of the test soil from the stainless pipe 1219 in the bottom of the pile. After closing the stainless pipe and allowing the solution to stand for 5 hours, the pump was started. The TCE concentration in the air at the outlet on the top of the pile was recorded and measured by gas chromatography (detector: FID, manufactured by Shimadzu Corp., Japan).

The test results are shown in FIG. 13. As is clear, the advantages of the present invention were found to be caused not by adsorption or the like, but by decomposition by the microorganism.

EXAMPLE 4

Figure 14:
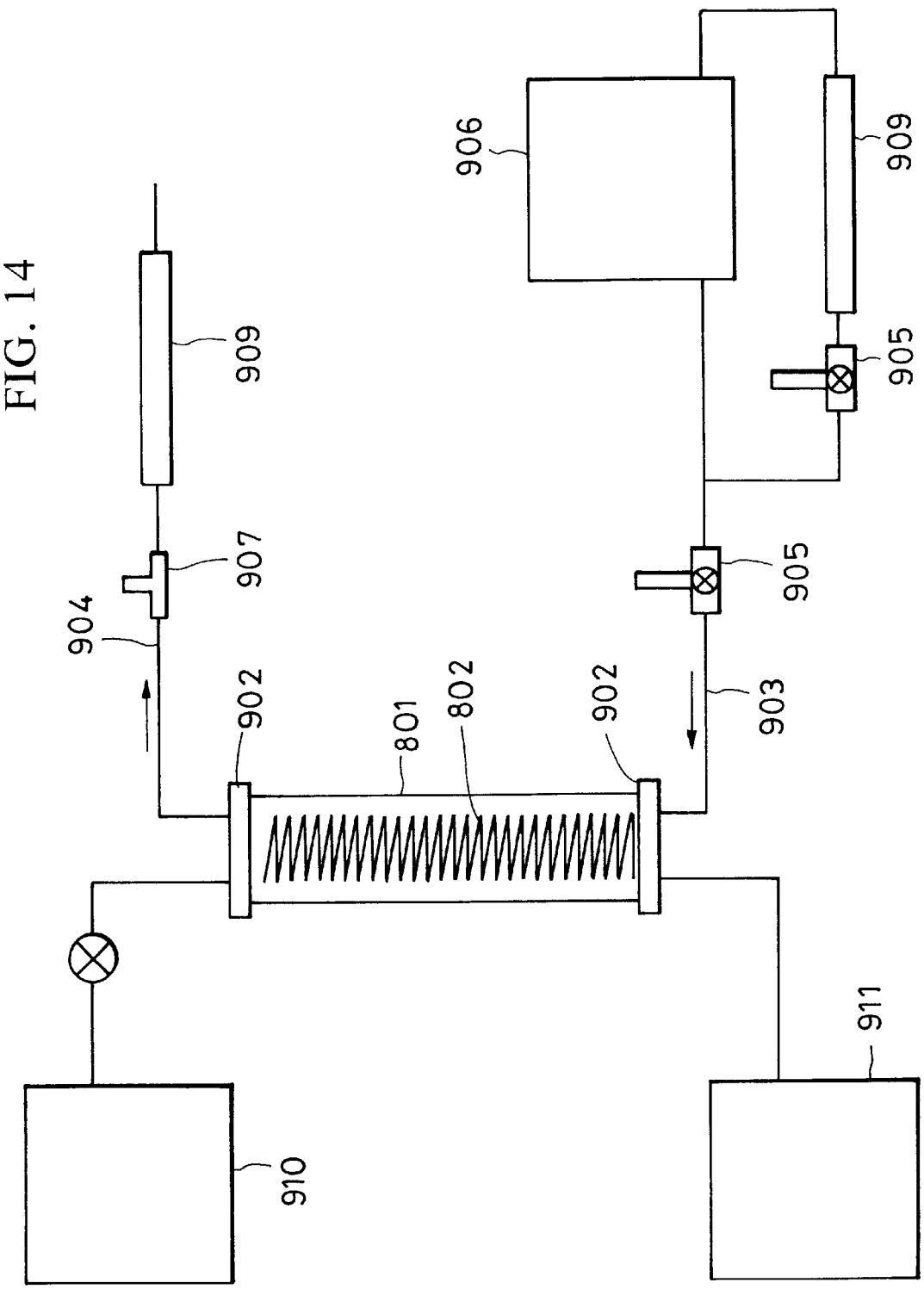
FIG. 14 is a schematic view illustrating a construction of an apparatus for remedying a polluted medium used in Example 4.

The apparatus shown in FIGS. 8 and 14 was set up according to the following procedure.

As a tubular case 801 constituting a reactor were prepared a glass column (inner diameter 30 mm, length 1000 mm) having screwed openings at both ends, and two screw caps 902. Inside the screw caps 902 were lined with Teflon-coated rubber packings were inserted, centers of the caps and packings were needle-holed and 0.7 mm-Teflon tubes 903,904 were led therethrough to respectively form an inlet 803 and outlet 804 for the pollutant into the tubular case 801. One end of the Teflon tube 903 was connected to a standard gas generator 906 (Permeater PD-1B, manufactured by Gastech Inc.), and one end of another Teflon-tube 904 was connected to a sampling port 907 and a trap 909 filled with activated carbon.

Next, a Poreflon Filter Tube (outer diameter 4 mm, inner diameter 3 mm; Flon Kogyo K.K.) as a tubular member 802 was inserted about 30 m into the column, both ends of the tube were led out of the column through holes opened in the packings and screw caps 902, and one was connected to a tank (reservoir) 910 for supplying the second medium containing a microorganism, and the other was connected to a waste tank 911. The Poreflon Filter Tube was spirally charged as shown in FIG. 8 in such a manner that flow of the first medium containing the microorganism in the tube was directed from the polluted-medium outlet 804 to the polluted-medium inlet 803 of the column.

In the reservoir 910 for the second medium was filled with a culture medium in which a microorganism capable of decomposing the pollutant had been cultivated. A fresh and living culture medium was resupplied to the reservoir every day. As the microorganism, strain JM1 (FERM BP-5352) was employed, in a cell concentration of $1.2 \times 10^8$ cell/ml after cultivating for 3 days. The medium composition was as follows.

| | |
|---|---|
| $Na_2HPO_4$ | 6.2 g/l |
| $KH_2PO_4$ | 3 g/l |
| NaCl | 0.5 g/l |
| $NH_4Cl$ | 1 g/l |
| Sodium glutamate | 5 g/l |
| Water | balance |

The standard gas generator 906 was supplied with trichloroethylene (TCE) and adjusted to supply air containing 100 ppm of TCE to the column. The flow volume of the standard gas was regulated to 3 l/hr with the flow meter 905.

The column was then fixed erect on a tripod, and the flow rate of the second medium was controlled to 5.9 ml/hr by adjusting the heights of the reservoir 910 for the second medium and the waste tank 911. This flow rate was such that the microorganism passed through the Poreflon Filter Tube in the column in about 1.5 days.

Figure 15:
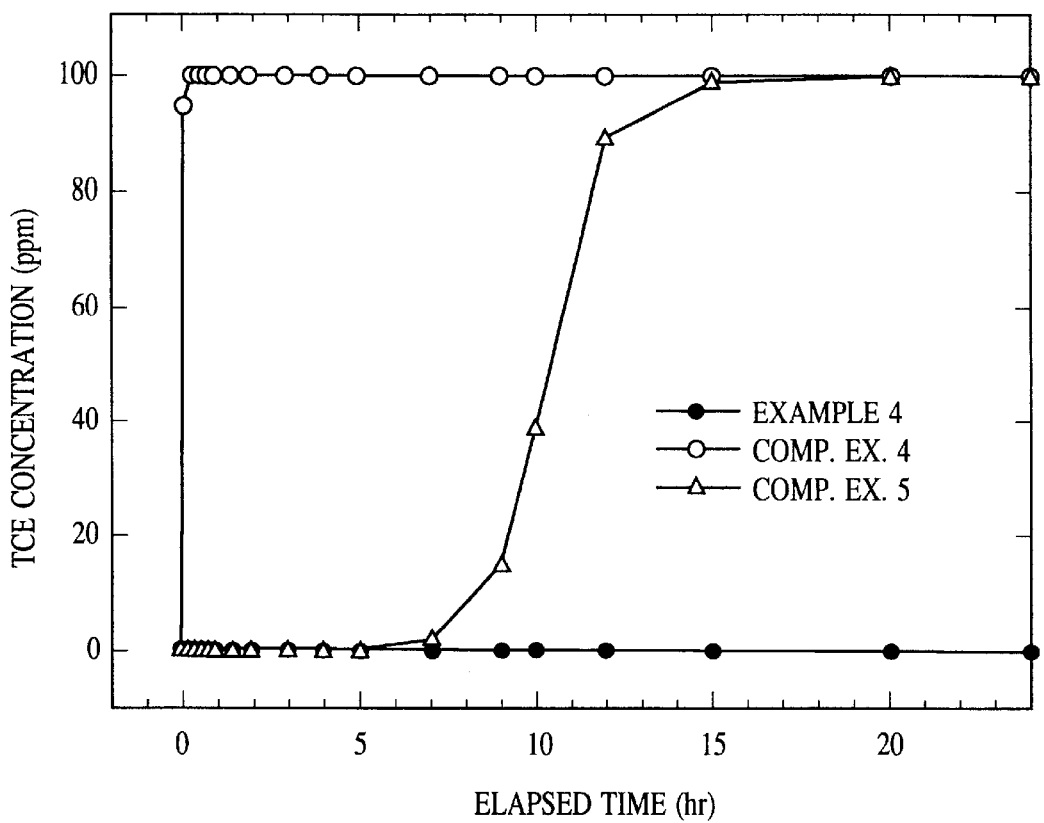
FIG. 15 is a graph showing changes with time of TCE concentrations in polluted media in Example 4, and Comparative Examples 4 and 5.
Figure 16:
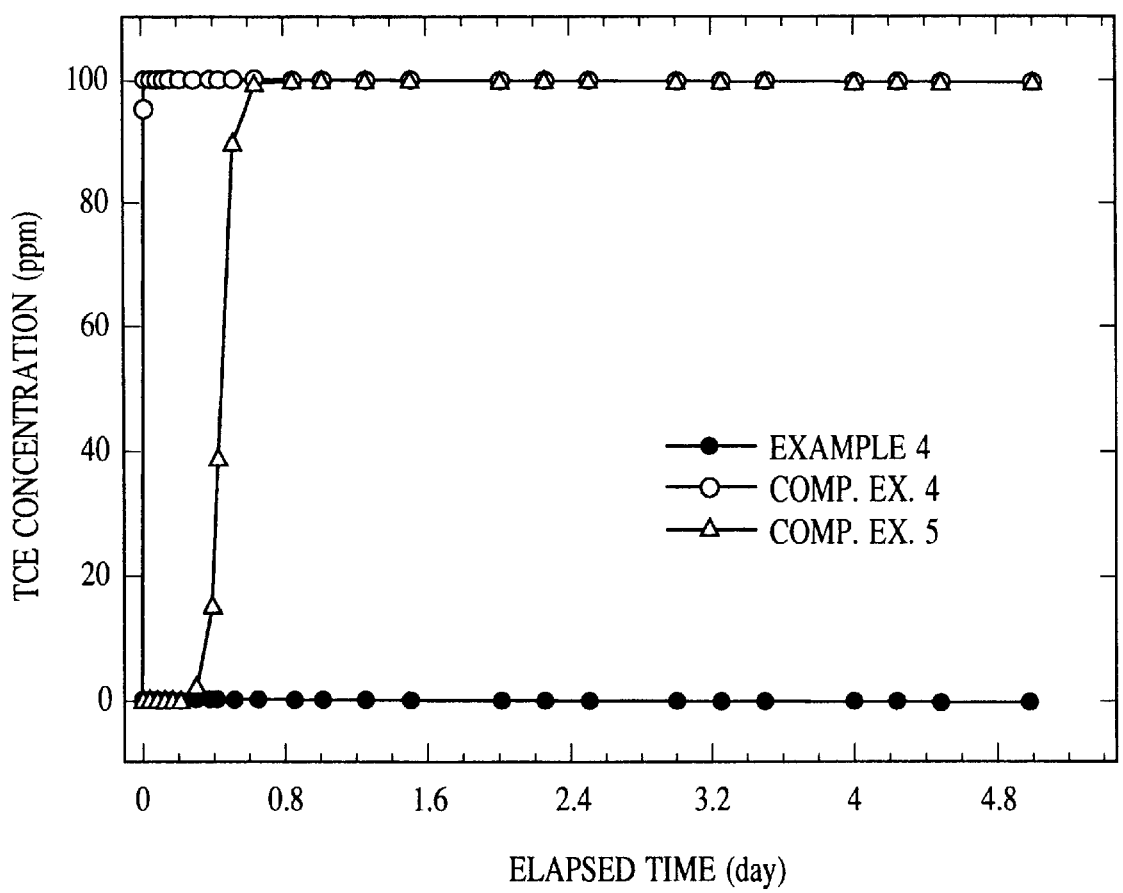
FIG. 16 is a graph showing changes with time of TCE concentrations in polluted media in Example 4, and Comparative Examples 4 and 5.

Next, the culture medium containing the microorganism was charged to supply the Poreflon Filter Tube, and after completion of charging the culture medium in the tube, the TCE-containing air was charged. The TCE concentration in the air was monitored with the sampling port 907, and measured by gas chromatography equipped with FID (trade name: GC14B; manufactured by Shimadzu Corp., Japan). As a result, TCE was not detected in 5-days continuous measurement, as shown in FIGS. 15, 16. Though the flow rate of the second medium in this example was about one third of that in Example 1, there was no significant difference in the TCE concentrations in the gas between both examples. This indicates that the decomposing efficiency of TCE in this example is further enhanced to that of Example 1.

Comparative Example 4

The TCE concentration was measured and monitored for 5 days in the same manner as in Example 4, except that the reservoir 910 was filled with only a culture medium. As is apparent from FIGS. 15 and 16, TCE began to be detected at the time when the air inside the column was replaced. This indicates that TCE was decomposed by the microorganism in Example 4.

Comparative Example 5

The TCE concentration in the air from the Teflon Filter Tube 904 was monitored and measured for 5 days according to the same procedure as Example 4, except that the culture medium was not resupplied after the initial charge to the Teflon tube 904. TCE was detected about 10 hours into the test, and in 17 hours the apparatus nearly lost its remediation activity, as illustrated in FIGS. 15 and 16.

EXAMPLE 5

A test was carried out in the same manner as in Example 4, except instead of the standard gas generator 906, a tank containing 40 l of a 5-ppm TCE aqueous solution was used so as to supply the TCE aqueous solution to the column at a flow rate of 0.25 /hr. As the supply means for the TCE solution to the column a roller pump (RP-MRF1; manufactured by FURUE SCIENCE Co., Ltd.) was employed. The treated water discharged from the Teflon tube 904 was sampled from the sampling port 907, and subjected to measurement in a conventional manner with a gas chromatography equipped with FID (trade name: GC14B; manufactured by Shimadzu Corp., Japan). The test results are set forth in FIG. 17. As is apparent from FIG. 17, the concentration of the polluted water gradually decreased with a decreasing TCE aqueous solution in the tank for supply, since TCE in the solution was evoluted to a gas phase in the tank. TCE was undetected 4 days into the test as completely decomposed, although it had been detected for 3 days after initiation of the test. It was found that this test system provides, at most, decomposition of TCE up to a rate of about 2 mg per hour.

Reference Example 1

Figure 17:
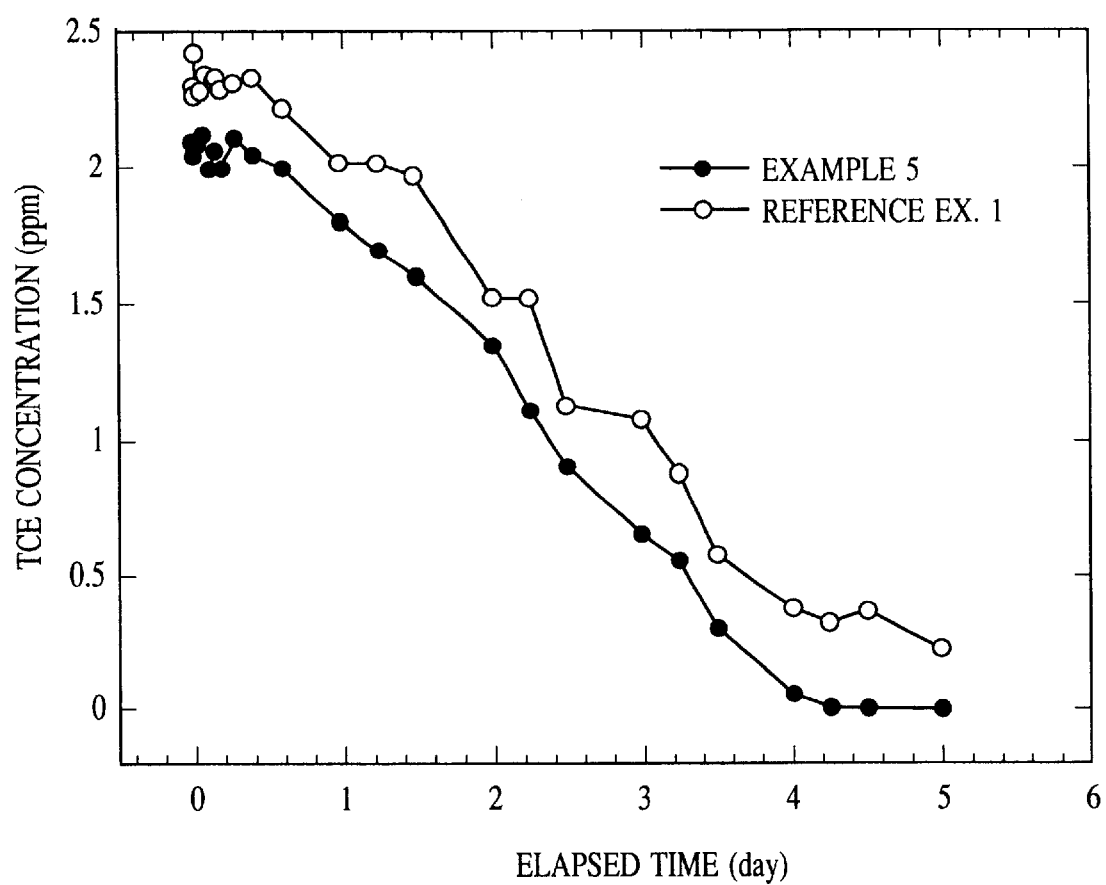
FIG. 17 is a graph showing changes with time of TCE concentrations in polluted media in Example 5 and Reference Example 1.

The TCE concentration in the treated water was monitored and measured for 5 days in a similar manner to that of Example 5, except that the Poreflon Filter Tube was charged in the column in such a manner that the flow direction of the second medium in the Poreflon Filter Tube was random relative to that of the first medium in the column, as illustrated in FIG. 4. As shown in FIG. 17, TCE in this Reference Example was always detected in somewhat higher concentrations than those of Example 5.

Reference Example 2

Figure 18:
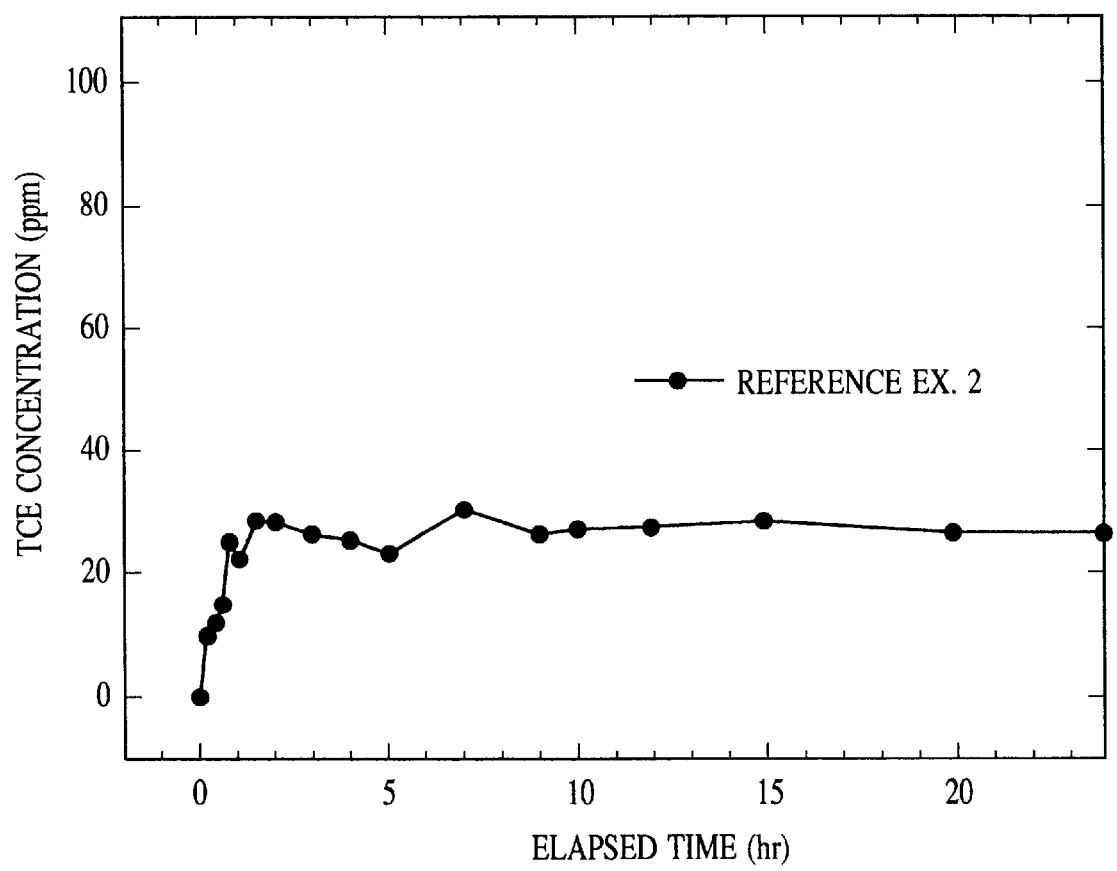
FIG. 18 is a graph showing a change with time of a TCE concentration in a polluted medium in Reference Example 2.

A remediation test was carried out in the same manner as in Example 4, except that the TCE-containing gas and the microorganism-containing culture medium were transported in the same direction. As is apparent from the results shown in FIG. 18, the TCE concentration in the gas could be decreased from 100 ppm to about 20 ppm constantly.

Other embodiments and variations will be obvious to those skilled in this art, this invention is not to be limited except as set forth in the following claims.

What is claimed is:

1. An apparatus for remedying a polluted medium comprising a housing having:

(a) a first passage provided with a first medium containing a pollutant;

(b) a second passage provided with a second medium containing a microorganism for decomposing the pollutant;

(c) a membrane permeable to the pollutant and impermeable to the microorganism, said membrane interposed between said first and second passages; and (d) means to cause the first medium and the second medium to flow in opposite directions.

2. The apparatus according to claim 1, wherein the first passage is a tubular case having a first opening and a second opening, the second passage is a tubular member having an outer wall composed of the membrane and the tubular member is spaced so that the membrane interposes the first medium and the second medium.

3. The apparatus according to claim 1, wherein the tubular member is spirally encased in the tubular case.

4. The apparatus according to claim 1, wherein the membrane is a porous resin.

5. An apparatus according to claim 1, wherein the polluted medium is polluted soil.

6. An apparatus according to claim 2, wherein the tubular case is pencil-shaped having a first opening and a second opening at the top and bottom thereof, respectively.

7. An apparatus according to claim 2, wherein a tubular membrane having first and second openings is encased in the tubular case, the tubular membrane having an outer wall composed of a membrane permeable to a pollutant in a soil and impermeable to a microorganism capable of degrading the pollutant.

8. An apparatus according to claim 7, wherein the tubular membrane has first and second openings provided at the top of a tubular case.

* * * * *